(12) United States Patent
Vorhoff

(10) Patent No.: US 10,914,119 B2
(45) Date of Patent: Feb. 9, 2021

(54) DRILLING TOOL FOR SINKING AUTOMATICALLY DIRECTIONALLY MONITORED BORES

(71) Applicant: Smart Drilling GmbH, Gelsenkirchen (DE)

(72) Inventor: Werner Vorhoff, Wesel (DE)

(73) Assignee: Smart Drilling GmbH

( * ) Notice: Subject to any disclaimer, the term of this patent is extended or adjusted under 35 U.S.C. 154(b) by 182 days.

(21) Appl. No.: 16/076,669

(22) PCT Filed: Feb. 8, 2017

(86) PCT No.: PCT/DE2017/000036
§ 371 (c)(1),
(2) Date: Aug. 8, 2018

(87) PCT Pub. No.: WO2017/137026
PCT Pub. Date: Aug. 17, 2017

(65) Prior Publication Data
US 2019/0085640 A1 Mar. 21, 2019

(30) Foreign Application Priority Data
Feb. 8, 2016 (DE) .................. 10 2016 001 779

(51) Int. Cl.
*E21B 17/10* (2006.01)
*F03G 7/06* (2006.01)
(Continued)

(52) U.S. Cl.
CPC .............. *E21B 7/06* (2013.01); *E21B 17/006* (2013.01); *E21B 17/04* (2013.01);
(Continued)

(58) Field of Classification Search
CPC ........................... E21B 17/1014; E21B 7/06
See application file for complete search history.

(56) References Cited

U.S. PATENT DOCUMENTS

RE30,055 E * 7/1979 Claycomb ............... E21B 47/20
367/84
4,501,337 A 2/1985 Dickinson, III
(Continued)

FOREIGN PATENT DOCUMENTS

| CN | 105156030 A | 12/2015 |
| DE | 10 2008 063940 A1 | 7/2010 |
| JP | H10255619 A | 9/1998 |

OTHER PUBLICATIONS

Anonymous: "Nickel Titanium—Wikipedia", Jan. 23, 2016, XP055381117, Retrieved from the Internet: URL:https://en.wikipedia.org/w/index.php?title=Nickel_titanium&oldid=701251459.
(Continued)

*Primary Examiner* — Jennifer H Gay
(74) *Attorney, Agent, or Firm* — Conley Rose, P.C.

(57) ABSTRACT

A drilling tool includes a tubular housing, a bit drive shaft configured to rotate in the housing and support a rotary drill bit at a lower end of the bit drive shaft, and a plurality of bracing devices arranged in the housing. The drilling tool also includes a control device configured to actuate the bracing devices, wherein the bracing devices include anchoring elements and an actuator assembly to which the anchoring elements are coupled The anchoring elements are distributed over the circumference of the housing, wherein the anchoring elements are movable radially outwardly and inwardly and are configured to be retracted into grooves in the housing The radial movability of said anchoring elements is temperature-controlled by the actuator assembly which includes at least one heat-expandable pressure medium, and wherein the pressure medium includes at least one of a gas and a liquid.

20 Claims, 2 Drawing Sheets

(51) Int. Cl.
*E21B 17/00* (2006.01)
*E21B 47/18* (2012.01)
*E21B 7/06* (2006.01)
*E21B 17/04* (2006.01)
*E21B 17/18* (2006.01)

(52) U.S. Cl.
CPC .......... *E21B 17/1014* (2013.01); *E21B 17/18* (2013.01); *E21B 47/18* (2013.01); *F03G 7/06* (2013.01)

(56) References Cited

U.S. PATENT DOCUMENTS

| | | | |
|---|---|---|---|
| 7,423,932 B1* | 9/2008 | Jeter | E21B 47/22 367/85 |
| 7,434,634 B1* | 10/2008 | Hall | E21B 41/0085 166/65.1 |
| 7,631,707 B2* | 12/2009 | Ma | E21B 7/06 175/61 |
| 8,087,479 B2* | 1/2012 | Kulkarni | E21B 10/62 175/73 |
| 9,273,522 B2* | 3/2016 | Hummes | E21B 17/07 |
| 9,580,976 B1* | 2/2017 | Grubelich | E21B 17/1014 |
| 9,938,814 B2* | 4/2018 | Hay | E21B 47/01 |
| 10,337,250 B2* | 7/2019 | Turner | E21B 47/02 |
| 2006/0034154 A1* | 2/2006 | Perry | E21B 47/20 367/84 |
| 2007/0227775 A1* | 10/2007 | Ma | E21B 7/06 175/26 |
| 2009/0194334 A1* | 8/2009 | Johnson | E21B 7/06 175/61 |
| 2011/0031025 A1* | 2/2011 | Kulkarni | E21B 10/62 175/76 |
| 2015/0152723 A1* | 6/2015 | Hay | E21B 47/01 175/17 |
| 2015/0218904 A1* | 8/2015 | Chauffe | E21B 33/128 166/250.01 |
| 2015/0218934 A1* | 8/2015 | Turner | E21B 47/01 175/45 |
| 2019/0048702 A1* | 2/2019 | Vorhoff | E21B 7/04 |
| 2019/0085640 A1* | 3/2019 | Vorhoff | F03G 7/06 |

OTHER PUBLICATIONS

Rau, G: "Thermal Actuators", Jun. 27, 2014, XP055381154, Retrieved from the Internet: URL:https://www.g-rau.de/fileadmin/gustavrau/downloads/service/downloads/thermal_actuators.pdf.
International Search Report dated Jun. 21, 2017, for International Application No. PCT/DE2017/000036 (3 pgs).
First Chinese Office Action dated Apr. 1, 2020, and search report for Application No. 201780021156.X, with English translation.

* cited by examiner

DRILLING TOOL FOR SINKING AUTOMATICALLY DIRECTIONALLY MONITORED BORES

CROSS-REFERENCE TO RELATED APPLICATIONS

This application is a 35 U.S.C. § 371 national stage application of PCT/DE2017/000036 filed Feb. 8, 2017, entitled "Drilling Tool for Sinking Automatically Directionally Monitored Bores," which claims priority to German application No. DE 10 2016 001 779.1 filed Feb. 8, 2016, both of which are incorporated herein in their entirety for all purposes.

STATEMENT REGARDING FEDERALLY SPONSORED RESEARCH OR DEVELOPMENT

Not applicable.

BACKGROUND

The invention relates to a low-maintenance, operationally reliable drilling tool for undisrupted continuous operation for the sinking of bores into underground rock formations with specification of a selectable direction for the wellbore, said drilling tool comprising a rotatable tubular housing, a bit drive shaft, which preferably rotates in the housing and bears a rotary drill bit at the end of said bit drive shaft that protrudes from the housing, a plurality of bracing devices arranged in the housing for generating directing forces having radially alignable force components for the purpose of aligning the drilling tool during a drilling operation, and a method for controlling deep-well drilling.

Directional drilling is the term used, including in the invention, for drilling methods that enable the direction of a bore to be influenced. Steered drilling is achieved using directional drilling systems, such as the downhole motor/bent sub combination or automatically steered drilling systems, known as RSS systems (rotary steerable systems). These systems allow wellbore paths to be steered in any direction. For this purpose, values for inclination and direction are measured and if necessary, corrections to direction and/or inclination are made. Adjustments of inclination and direction require forces that effect these changes. These forces are generated hydraulically, electrically, mechanically or pneumatically. The generation of these forces is technically complex and costly and must be capable of withstanding all the harsh conditions encountered during drilling. A simple method of generating the force required to implement steering operations during drilling would make directional drilling even more reliable and more economical and would open up many new areas of application.

Methods and systems for producing a wellbore and devices for path-oriented deep drilling in earth formations are known in the prior art. Deviations of conventional drilling tools from a specified direction may be caused, e.g. by inhomogeneous or anisotropic earth formations, the configuration of the drilling tool, torque, etc.

For instance, one conventional method of directed drilling at offshore drilling sites, more particularly a device for achieving a deflected protective pipe assembly, is known, in which the protective pipe is composed of individual segments, a deflected section is welded at an angle to the distal end of the otherwise straight protective pipe, and the protective pipe is routed through a vertically aligned guide; the bend is then held or positioned in the desired orientation, and finally, the protective pipe with the deflection is driven into the substrata and the protective pipe is moved laterally from its point of entry into the substrata to its final deflected position. Although the conventional method enables deflection with a desired curvature and alignment to facilitate directional wellbore drilling into the substrata at an offshore drilling site, the method is not suitable for continuous deep drilling since the deflected sections must be welded to the protective pipe for deflection of the deflected sections above ground, necessitating an interruption of drilling operations. The conventional method has the additional disadvantage that the rotary drill bit can be controlled only from the outside, from a control console.

A further conventional method relates to the production of a wellbore in an earth formation using a drill assembly that comprises a drill string extending into the wellbore, also called a drill pipe string, and a motor that operates downhole and includes a housing and a drive shaft for driving the drill head. The drive shaft is inclined relative to the longitudinal axis of the lower part of the drill string, and the motor housing is connected to the lower part of the drill string such that the motor housing is able to rotate about the longitudinal axis. Said drill assembly further comprises conventional control means for controlling rotation of the motor housing about said longitudinal axis relative to the drill string. In the conventional method, a downhole motor is used, which has a housing with an adjustable bend; during straight drilling the bend is adjusted to a bend angle of zero, whereas during curve drilling, the bend is adjusted to a bend angle corresponding to the desired wellbore curvature. Before the curved wellbore section can be drilled, as one of the additional disadvantages of the conventional method, the drilling operation must be interrupted so that the motor housing can be rotated relative to the drill string by a selected number of angle increments, moving the motor housing into the desired azimuthal direction.

Another conventional drill assembly, which comprises a rotary table, a drill string, a first downhole motor having an inclined output shaft, and a housing connected to an output shaft of a second motor, seeks to produce the curvature of a wellbore path by controlling two motors. The second motor may be selectively allowed to rotate relative to the drill string during drilling of a straight wellbore section, or may be locked to the drill string during drilling of a curved wellbore section. Before drilling of the curved section begins, the rotary table is used to align the drill string such that the output shaft is pointing in the desired direction. These methods are characterized by high control effort and complexity of the drilling assembly as such, and the adequate success of directional deep drilling using these methods is questionable.

Also proposed for conventional directional drilling is a device which has an eccentricity to effect cornering. Traditionally, during straight drilling, the part having the eccentricity rotates at a constant angular velocity, so that the eccentricity effect is lost. When transitioning to curve drilling, the part having the eccentricity is stopped in a certain angular position for a certain period of time and remains in this angular position until the curved path is completed or as long as the specified curved path is maintained. Then if the drill head moves away from the intended trajectory, the angular position must be corrected until the drilling curve is reached again and the drill head must be reset to the trajectory. Over the course of a longer curve, therefore, the angular position of the drill head must typically be positioned multiple times. The disadvantages of the conventional method involve not only the costly interruption of drilling operations required for positioning the drill head but also the significant widening of the wellbore and the high energy use. Also to be considered is the high number of steering requirements that must be observed and monitored during cornering.

Known in the prior art is a steerable rotary drilling system, which has bracing devices arranged laterally in the external housing of the rotary drilling system. The bracing devices consist of a plurality of bracing elements, each composed of two parts articulated to one another. One unattached end of each two-part bracing element is coupled to the external housing, and the other unattached end of each two-part bracing element is guided movably by means of a sliding mechanism along the external housing, lengthwise to the longitudinal axis of the external housing. The sliding mechanism is connected to a strand of a shape memory alloy (SMA), which is heated by an application of electric power, causing it to move from its neutral position to its deflected position, i.e. its operational position. In the operational position, the sliding mechanism is moved toward the one unattached end of the bracing elements, shortening the distance between the two unattached ends of the bracing elements. This shortening causes the bracing elements to angle radially outward with a reduction in the angle formed by the two bracing elements of the bracing device, and to move from their extended home position to their angled end position for the purpose of generating directing forces.

However, due to the use of strands of shape memory alloys (SMA), the conventional rotary drilling system involves the disadvantage that, with the increasing number of transitions of the sliding mechanism from the neutral position to the operational position and back to the neutral position, the strands of shape memory alloy increasingly retain residual elongation in their neutral position, so that as the number of transitions increases, not only does the disadvantage of residual elongation occur, the additional disadvantage of an increase in the extent of residual elongation of the strands also becomes increasingly apparent.

Due to the residual elongation of the strands of shape memory alloys (SMA), the sliding mechanism will no longer fully return to its desired neutral position, and as a result, the bracing elements remain partially angled in the home position and can no longer reach their original extended home position. Because the bracing elements remain angled in the home position, the alignment of the rotary drilling system according to preset specifications is understandably significantly impaired. Moreover, external intervention into the pivotability of the bracing devices, as is typical with the occurrence of residual elongation of conventional shape memory alloys (SMA), is not possible.

Furthermore, this prior art disregards the further disadvantage of conventional rotary drilling systems that as the number of transitions of the sliding mechanism actuated by the strands of shape memory alloys (SMA) from its neutral position to its operational position and back to its neutral position increases, the residual elongation the extent of residual elongation steadily increases, so that the degree of angling of the bracing elements relative to one another steadily increases, and as a consequence, the decrease in the angle formed by the two bracing elements of the bracing device also increases. And this disadvantage cannot be offset by acting on bracing elements of adjacent bracing devices in order to make the necessary corrections to direction and inclination and thereby advance the drilling process with the conventional rotary drilling system in a predefined direction, since the adjacent bracing elements in question also exhibit residual elongation as a disadvantage, due to their strands made of shape memory alloys (SMA).

The consequences for the conventional rotary drilling system of the loss of alignment and control capability of the bracing devices include not only the costly backing out, replacement and reintroduction of said drilling system but also the interruption of drilling and the costly shutdown of the drilling system.

BRIEF SUMMARY

The object of the invention is therefore to provide a drilling tool which is perpetually steerable, the bracing devices of which can be reliably moved with the anchoring elements into the home position and the end position without the magnitude of the radially outwardly pivotable anchoring elements being negatively impacted.

The object is further to provide a drilling tool that does not require additional monitoring of the pivoting of the anchoring elements.

The drilling tool to be provided also should not require any additional monitoring means, thereby keeping both production and maintenance costs low during continuous drilling operations.

Further, in view of the harsh drilling conditions encountered at great depths, the ruggedness of the drilling tool should not be limited by limited control of the same.

This prior art also disregards the further disadvantage of the conventional rotary drilling system that includes the strands made from shape memory alloys (SMA) for actuating the anchoring elements via the sliding mechanism, that, although the clamping elements can be moved from the neutral position to the operational position by means of the strands, provided there is no residual elongation, the anchoring elements are not capable of pivoting only a predefined distance into the operational position, since the shape memory alloys (SMA) of the strands enable them to move only into two positions, and not to remain for long periods in a predefined state.

Therefore, in view of the need for alignment capability at great depths in accordance with inclination and/or azimuthal specifications, the drilling tool to be provided should also enable the extent of pivotability of the anchoring elements to be specified.

The conventional rotary drilling system also has the disadvantage that due to the internal crystalline structure of the shape memory alloy (SMA), when the strands of shape memory alloy (SMA) that cause the bracing elements controlled via the sliding mechanism to pivot outward and inward cool, the strands cannot perform any work, and as a result, the transition of the anchoring elements from the operational position to the neutral position remains incomplete or is at least hampered.

A drilling tool is therefore also to be provided, the anchoring elements of which are able to return reliably, unhindered and force-loaded, from their outwardly pivoted end position to their home position.

Likewise known in the prior art to those skilled in the art is a conventional drilling tool which has anchoring elements that can be extended outward, the extension of said anchoring elements being hydraulically controlled. The anchoring elements are coupled or connected to the pistons of piston-cylinder assemblies; the cylinders are connected via lines to magnetically controlled piston-cylinder assemblies, so that the hydraulic solution in the lines causes the anchoring elements to move radially outward. However, this conventional drilling tool has the disadvantage of structural complexity, since the conventional drilling tool has a plurality of piston-cylinder assemblies which apply force to the hydraulic fluid by means of the magnetically actuated pistons, and with the help of additional pistons are able to force the anchoring elements outward. It is likewise apparent that the more piston-cylinder units and lines of the same are found in the drilling tool, the greater the amount of monitoring required that could be avoided and the lower the desired ruggedness of the drilling tool for meeting the demands of deep directional drilling.

A drilling tool is therefore also to be provided that will reduce the number of components beyond those required for alignment and steering and will provide a sufficient degree of ruggedness for continuous operation during deep directional drilling.

The device for generating pressure pulses known in the prior art also does not solve the problem of providing a rugged and easy-to-operate drilling tool, as this conventional device is directed only toward avoiding turbulence in the flow of drilling fluid in a drilling tool to avoid impairment of performance and efficiency. Although in the conventional device, a generator, including a storage device, a clutch and a bearing of an impeller shaft, is located within an axially extending housing, which is filled with oil and forms a cylindrical annular gap opposite the drill pipe, and the drilling fluid for driving the impeller runs through the annular gap, and a pressure compensating tank with compensating piston, which is acted on by the drilling fluid, is located above a fluid reservoir in the housing, this prior art overlooks the need to provide a drilling tool with extremely sturdy bracing devices that are reliably movable and can be pivoted into two positions.

For ruggedness, the drilling tool should therefore be easily and reliably steerable and should have bracing devices with anchoring elements, which despite multiple cycles always reliably enable not only the desired pivoting from the home position to the end position and vice versa, but also the required degree of pivoting, e.g. into the end position.

It is also apparent from the prior art that the multiplicity of components required by the conventional device necessitates a high level of maintenance for the conventional device.

In addition, continuous directional drilling in accordance with inclination and/or azimuthal specifications is made more complicated both by the constant monitoring of the solenoid valves and the functioning thereof and by the monitoring of the position of the pistons in the end position and the home position.

Trouble-free functioning of the solenoid valves does not guarantee trouble-free functioning of the pistons. The conventional device therefore includes the further disadvantage of a large amount of effort expended monitoring the various movable components and the operating status thereof.

In addition, the many components that are required disadvantageously shorten the maintenance intervals for the conventional device, making it costly to operate.

Experience has also shown that deep drilling requires a rugged drilling tool with components that are not prone to failure so that the interaction among the solenoid valves and their cooperation with the bracing devices are impaired.

Additionally, the conventional device has not proven suitable for limiting the degree to which the anchoring elements are extended from the home position, even though controlling the degree of outward deflection of the anchoring elements may be desirable depending on the location, for example, depending upon the rock formation.

Other conventional methods and devices for directional drilling propose placing force-loaded gripping pads against the wall of the wellbore, which pads can be forced radially outward when acted on by pressure generated by pistons located on the inner sides of the pads. The pressurization of the pistons is effected by an annular axial multi-piston swashplate pump, the annular swashplate of which is selectively rotated, controlled by a coupling, which taps force from the shaft via an Oldham coupling. This device also necessitates maximum process monitoring both of the operation of the axial multi-piston swashplate pump and of the control of the various gripping pads. Since the conventional method leads to a significant expansion of the monitoring of drilling operations, at least simultaneous control via a control console above ground is advisable.

The object of the invention is to provide a drilling tool in which the structural design of the tools is greatly simplified.

Furthermore, steering of the drilling tool, e.g. both from the standpoint of inclination and from the standpoint of azimuth, should be possible without high maintenance efforts, so that continuous directional drilling is provided.

In addition, control of the drilling tool to be provided should take place in quasi real-time, meaning that even a slight curvature requirement or a deviation of the wellbore from preset specifications is taken into account on site, underground, by means of the control device installed in the housing, without the need for external control or intervention from above ground.

Apart from that, the steering system integrated into the drilling tool should be simple and distinguished by the use of fewer mechanical parts than in the conventional devices and methods, to ensure a rugged drilling tool and continuous operation during directional deep drilling that is little prone to failure.

The drilling tool to be provided should also be characterized by a high level of efficiency and should offer automatic course-controlled directional drilling offshore at great depths.

Also, the intervals between maintenance of the drilling tool to be provided should be increased substantially to enable directional drilling to be carried out cost-effectively underground.

In addition, the operating duration of the drilling tool should be increased substantially in order to economically reduce the amount of replacement material needed and the frequency with which the drilling tool must be backed out.

Finally, the transmission of data acquired by measuring sensors located in the drilling tool should necessitate a compact and cost-saving design of the drilling tool and should ensure low-wear and low-energy data transmission and guarantee the flawless transmission of data.

The objects are attained by the main claim and the subsidiary independent claim, with the dependent claims relating to preferred embodiments and refinements of the invention.

The invention attains the objects by generating temperature differences. A temperature increase leads to the expansion of materials, solids, liquids such as hydraulic fluid, and gases. Each limited expansion results in a generation of force, which can be used for control purposes. The combination of temperature increase and cooling enables control processes to be carried out. Moreover, this force generation is technically simple, and the substantially smaller number of components makes directional drilling with such equipment economically more advantageous.

The invention relates to a low-maintenance, operationally reliable drilling tool for disruption-free continuous operation for the sinking of bores into underground rock formations with specification of a selectable or predefined directional path of the wellbore, said device having a tubular, advantageously rotatable housing, a bit drive shaft, preferably revolving, i.e. rotatable, in the housing, and bearing or capable of bearing at its lower end, which protrudes from the housing, a rotary drill bit, with an upper end of the bit drive shaft preferably being couplable to a preferably rotatable drill pipe string, at least one, and preferably a plurality of electrically operable bracing devices, arranged in the housing, and having actuating means for generating directing forces having radially alignable force components for the purpose of aligning the drilling tool during a drilling operation, and a control device for controlling the bracing devices and the actuating means thereof, which is characterized in that the bracing devices include anchoring elements arranged at least along one bracing plane, which are movable radially outward and inward and can preferably be retracted shield-like into grooves or recesses in the exterior of the housing, and are distributed over the circumference thereof, the mobility of said anchoring elements being temperature controlled, the actuating means are coupled to the anchoring elements, the actuating means, preferably embodied as piston-cylinder assemblies, contain at least one pressure medium, the actuating means can be operated by activating at least one heat-expandable pressure medium, the pressure medium comprising a solid, a gas and/or a liquid, the solid material, in particular, has a coefficient of linear expansion a at 20° C. of 1.5 to 30.0×10$^{-6}$K$^{-1}$, or α in 10$^{-6}$K$^{-1}$ of 1.5 to 30.0 at 20° C., and/or the liquid has a coefficient of volume expansion γ at 18° C. of 5.0 to 20.0×10$^{-4}$K$^{-1}$, or γ in 10$^{-3}$K$^{-1}$ of 0.5 to 2.0 at 18° C.

A further subject matter of the invention is directed to a method for path-controlled directional drilling in deep underground layers using the low-maintenance, operationally reliable drilling tool for undisrupted continuous operation for the sinking of bores into underground rock formations, wherein the data, in particular measured variables, e.g. position data, acquired by sensor systems of a control device, are forwarded to the electronic measured-value processor of the control device, in the measured-value processor, the data are fed to a control loop, preferably for multivariable control, in the measured-value processor, the data, in particular position data, in the form of measured variables or control variables, are compared with nominal values stored in the measured-value processor as target values, and in the case of deviations from the specified target values, modified output variables or manipulated variables are forwarded as signals from the control device to a switch, in particular to an on/off switch, for the purpose of applying temperature to the pressure medium, or to a regulator for the infinitely variable application of temperature according to specifications to the pressure medium in the bracing devices by supplying electric power to heating devices of the same.

A further subject matter of the invention relates to the use of the drilling tool, comprising a tubular, advantageously rotatable, housing, a bit drive shaft, which preferably revolves, i.e. is rotatable, in the housing and which bears or is capable of bearing a rotary drill bit at its lower end, which protrudes from the housing, a rotary drill bit, with an upper end of the bit drive shaft being couplable to a preferably rotatable drill pipe string, at least one, and preferably a plurality of electrically operable bracing devices, arranged in the housing, for generating directing forces having radially alignable force components for the purpose of aligning the drilling tool during a drilling operation, said bracing devices having actuating means, and a control device for controlling the bracing devices and the actuating means thereof, the bracing devices including anchoring elements arranged at least in one bracing plane and distributed over the circumference of the external housing, which are movable radially outwardly and inwardly and can preferably be retracted shield-like into grooves or recesses in the exterior of the housing, the mobility of said anchoring elements being temperature controlled, the actuating means being coupled to the anchoring elements, the actuating means, preferably embodied as piston-cylinder assemblies, containing at least one pressure medium, and the actuating means being operable by activating at least one heat-expandable pressure medium, the pressure medium comprising a solid, a gas and/or a liquid, for undisrupted continuous operation, advantageously in deep directional drilling, for sinking bores into underground rock formations, especially at great depths, with specification of a selectable direction for the wellbore.

The low-maintenance, operationally reliable drilling tool according to the invention comprises a tubular housing, also called the external housing. In one embodiment of the drilling tool according to the invention, the upper end of the bit drive shaft that faces away from the rotary drill bit may be coupled to the conventional drill pipe string, also called the drill string, in a manner known to a person skilled in the art. In one embodiment of the drilling tool according to the invention, the bit drive shaft can be coupled, e.g. rotatably, to the drill pipe string, in which case a drive, for example, e.g. a hydraulically and/or electrically operated drive, located in the housing of the drilling tool according to the invention, brings about the rotary movement or revolution of the bit drive shaft mounted rotatably in the housing, and/or the drill pipe string is fixedly coupled to the housing of the drilling tool according to the invention. In another embodiment of the drilling tool of the invention, the bit drive shaft may be fixedly coupled to the drill pipe string, so that the drill pipe string mounted rotatably in the housing of the drilling tool according to the invention is also capable of placing the bit drive shaft, mounted rotatably in the housing, in rotary movement or revolution.

For the purposes of the invention, a fixed coupling may also be understood as the locking of two components to one another without relative movement therebetween.

At least one, and preferably a plurality of bracing devices, aligned at least along one bracing plane, are arranged distributed in the direction of rotation around the housing or around the circumference in the external housing. The bracing devices can be activated electrically in that the bracing devices or parts thereof, such as their actuating means, can be heated. The bracing devices for generating directing forces that have radially alignable force components for the alignment of the drilling tool comprise anchoring elements that can be moved radially outward and inward, also called steering ribs, steering skids or steering shoes, etc.

The invention is also based upon the principle of providing the smallest possible number of moving parts required for directed drilling using the drilling tool, even at great depths; the bracing devices can thus have actuating means, the actuating means, as part of the bracing devices, being capable of generating directing forces, which have radially alignable force components for the alignment of the drilling tool during drilling operations, and which can be transmitted to the anchoring elements, also called steering ribs, which are coupled to the actuating means, so that the anchoring elements are able to move from their home position to their end position and back to the home position; the directing forces can be generated as a result of the thermal expansion brought about by heating, by action on the actuating means in the form of heating the actuating means or parts thereof. The movement of the anchoring elements and the actuating means or parts thereof from the end position to the home position can be generated by decreasing the temperature and/or by means of directing forces acting in the opposite direction. The actuation of the bracing devices, e.g. for the application of temperature, for decreasing the temperature, etc., is carried out by means of the control device located within the housing, which can be controlled externally from a control center and/or by means of control loops implemented therein. An application of temperature for the purposes of the invention may be understood as a temperature increase, for example heating by means of a heating device, or as a temperature decrease, for example cooling. The drilling tool according to the invention is characterized by a rugged, resilient construction, which is nonetheless low maintenance and operationally reliable during continuous operation, in contrast to the prior art.

The anchoring elements can be placed, force-loaded, against the wall of the wellbore, hereinafter referred to simply as the wellbore wall, i.e. they can be moved outward from their home position, or away from the housing or external housing, toward the wellbore wall and into a preferably defined or predetermined end position. In transitioning from the home position to the end position, the anchoring elements can be placed against the wellbore wall, inclined relative to the external housing or the bit drive shaft, in that the actuating means are placed, temperature-controlled and force-loaded, at least against one end of the anchoring elements, or are coupled thereto. The anchoring elements can likewise be moved outward, parallel to the external housing or the bit drive shaft, from their home position or away from the housing or external housing and toward the wellbore wall, into a preferably defined or predetermined end position, in which case the actuating means are placed, temperature-controlled and force-loaded, against both ends of the anchoring elements or are coupled thereto for the purpose of displacing the anchoring elements in parallel. It is also possible for one end of the anchoring elements to be articulated to the external housing while the other end of the anchoring elements is coupled to the actuating means in such a way that, when a temperature is applied to the actuating means, the anchoring elements in their end position form an angle of 90° or less with the bit drive shaft; the vertex of this angle may face toward or away from the rotary drill bit.

The anchoring elements are moved back from the preferably defined end position to the home position, in or on the external housing of the drilling tool according to the invention, as a result of a decrease in the temperature of the pressure medium. For the purposes of the invention, selectable can also be understood to mean that the directional path or the movements of the drilling tool can be specified or predefined from the outside, e.g. from an above-ground steering or control center, e.g. by overriding the nominal values stored as target values in the measured-value processor, and/or by means of the nominal values stored as target values in the measured-value processor.

The anchoring elements are retracted or extended by generating temperature differences in a pressure medium. For the purposes of the invention, a pressure medium is understood as a solid material, also called a solid, a gas and/or a liquid, e.g. glycerol, hydraulic fluid or hydraulic oils, which are characterized according to preset specifications by an expansion of the material, for example a linear expansion, or by an expansion of the liquid and the gas, for example a volume expansion, generated by heating, and also by a reduction in the linear expansion or volume expansion of the pressure media induced by a decrease in temperature.

An increase in the temperature of the pressure medium causes the pressure medium to expand. Each, e.g. limited expansion leads to a generation of force that can be used for the purpose of steering the drilling tool according to the invention along with its bracing devices and the anchoring elements thereof. When the pressure medium is heated, the anchoring elements can be placed, force-loaded, against the wellbore wall as a result of the transitioning of said anchoring elements from their home position to the end position, and when the temperature of the pressure medium is decreased, the anchoring elements can be moved back, again as a result of the transitioning of said anchoring elements from their end position to the home position.

Further, by utilizing the controllable, temperature-dependent expansion of the pressure medium, the amount of force applied to the anchoring elements against the wellbore wall can advantageously be controlled, as detailed below. The drilling tool according to the invention therefore provides anchoring elements as part of the bracing devices, which are capable not only of pivoting a predefined distance from the home position to the end position, but also of maintaining, at great depths, in accordance with the required specifications for inclination and/or azimuth, the degree of continuously variable extensibility, i.e. parallel displacement or pivotability, of the anchoring elements according to these specifications, without fatigue or limitation.

In an additional embodiment of the drilling tool of the invention, the anchoring element may be coupled at its opposite end that faces away from the rotary drill bit to the external housing via a spring, for example a coil spring or disk spring, the spring being capable of holding the anchoring element in its home position, wherein the anchoring element is guided along a rod-shaped pin or bar, aligned radially to the external housing and coupled to the external housing; the end of the anchoring element that faces the rotary drill bit is coupled to the outer end of the piston, so that when the piston is extended radially, the anchoring element is extended parallel to the external housing or to the longitudinal center axis thereof, or to the bit drive shaft, and can be placed with its entire surface against the wellbore wall.

For the purposes of the invention, an actuating means is also understood as a linear drive, in which a drive means is capable of describing rectilinear or curved movements as a result of the heating of the pressure medium disposed within the actuating means, and these movements can be transferred to the anchoring element, so that, for example, the anchoring element can be displaced in parallel from its home position to its end position, parallel to the bit drive shaft, the rotational axis of the rotary drill bit or the longitudinal center axis of the housing, and/or can be pivoted about a, preferably about a pivot or rotational axis, which can be aligned perpendicular to the bit drive shaft, the longitudinal center axis of the housing, forming an angle of less than 90°, for example, said angle being delimited by the anchoring element on one side and the bit drive shaft, the rotational axis of the rotary drill bit, or the longitudinal center axis of the housing on the other side. Suitable drive means in this case include, e.g. a rod containing a solid material with a high coefficient of linear expansion.

In another embodiment of the drilling tool according to the invention, the bracing device has at least one actuating means; the temperature-controlled drive means of the actuating means, e.g. a piston of a piston-cylinder assembly embodied as the actuating means, can be moved toward the wellbore wall, e.g. into the end position, and can be moved back in the opposite direction toward the housing or external housing or toward the longitudinal center axis of the housing or external housing, e.g. to the home position. These back and forth movements can be generated by means of the pressure medium located in the actuating means. The back and forth movements of the actuating means can be transmitted by means of conventional joints or articulated connections to the anchoring element coupled to the actuating means, for the purpose of moving the anchoring element from its home point to its end position and back from its end position to its home position. The back and forth movements may also be generated by the temperature differences, triggered by the control device, of at least one pressure medium located in the actuating means, or, e.g. by the temperature differences, triggered by the control device, of, e.g. at least two different pressure media located in the actuating means. The temperature differences can be generated by a temperature increase in the pressure medium, which is heated by a heating device, and by a subsequent temperature decrease and cooling of the pressure medium due to an absence of heating of the same. For the purposes of the invention, temperature control is also understood as control by heating and cooling of the pressure medium.

In an additional embodiment of the drilling tool according to the invention, the one pressure medium located in the actuating means can be heated or allowed to cool, inducing the back and forth movement of the actuating means or a part thereof, e.g. the drive means thereof, and of the anchoring element coupled thereto. In another embodiment of the drilling tool according to the invention, the pressure media located in a dual-action actuating means can induce the outward movement of the actuating means or a part thereof and of the anchoring element by the heating of one pressure medium located in the actuating means and can induce the return movement of the actuating means or a part thereof and of the anchoring element by the subsequent heating of the other pressure medium located in the actuating means. For the purposes of the invention, different pressure media may also be understood as gas, solid and liquid; for the purposes of the invention, different pressure media may also be understood to mean various solids, gases or liquids that have different expansion coefficients, such as coefficients of linear expansion or coefficients of volume expansion, of a solid.

One embodiment of the drilling tool according to the invention has a linear drive, e.g. as the actuating means. For the purposes of the invention, a linear drive may also be understood as a temperature-controlled drive that generates, e.g. movements along a straight line or along another predefined path. The linear drive can be activated hydraulically by means of a heat-expandable pressure medium. Suitable actuating means for the bracing device include, for example, a piston-cylinder assembly, in which case the anchoring element is coupled to the e.g. radially outwardly and inwardly movable piston of said assembly, and the anchoring element rests against the external housing in the home position. In one embodiment, the piston-cylinder assembly may have a chamber filled with the pressure medium, which is connected to a cylinder space of the piston-cylinder assembly so as to allow the passage of pressure medium, and in which cylinder space the piston can be operated. The piston in the cylinder space can thus be forced out of said space when the temperature of the pressure medium is increased, or can be forced back into said space when the pressure medium is allowed to cool. In one simple embodiment of the drilling tool of the invention, heat is applied to the cylinder space and/or to a shell delimiting the cylinder space by a heating device; in another embodiment of the drilling tool of the invention, heat can be applied to the chamber of the chamber housing, which is connected to the cylinder space so as to allow the passage of pressure medium, so that the pressure medium contained in the cylinder space, or contained in the cylinder space and the chamber, forces the piston outward as a result of volume expansion. In a completely different embodiment of the drilling tool of the invention, heat can be applied to both the chamber connected to the cylinder space and the cylinder space itself such that the pressure medium forces the piston outward. Thus, the application of heat to the chamber and the cylinder space, or only to the chamber or only to the cylinder space can also be controlled on site as required. For the purposes of the invention, connection is also understood as a connection that allows the passage of the pressure medium via lines, channels, or the like. When the pressure medium is heated, the piston is preferably displaced, e.g. radially to the longitudinal center axis of the housing, for the particularly force-loaded placement of the anchoring element against a wellbore wall during the transition thereof from the home position to the end position. When the pressure medium is chilled, the piston is also displaced, preferably radially to the longitudinal center axis of the housing, for placement of the anchoring element against said housing during the transition thereof from the end position to the home position.

In a further embodiment of the drilling tool of the invention, the actuating means in the form of the piston-cylinder assembly may also be configured as a dual-action cylinder, in which piston-cylinder assembly the piston has two opposing piston surfaces, so that the movements of the piston, which is movable in the cylinder or the cylinder space, can be controlled selectively by the alternating application of pressure medium or pressure media to its two piston surfaces. In one particular embodiment of the drilling tool of the invention, the pistons of the opposing piston-cylinder assemblies, e.g. of the same bracing plane, are coupled to one another, so that the extension of one piston from a home position to the end position causes the opposing piston to retract from its end position to its home position; the coupling of the opposing pistons can likewise be controlled such that the pistons move in opposite directions only as necessary.

The outer end of the piston is advantageously coupled to the anchoring element. When the pressure medium is heated and expanded, the piston can be displaced, preferably radially to the center longitudinal axis of the external housing, from its home position to its end position, at least in the direction of the anchoring element coupled thereto, enabling the anchoring element to reach the wellbore wall, force-loaded. The chilling or cooling of the pressure medium, e.g. as a result of a decrease in the temperature of the pressure medium, e.g. by interrupting the heating of the same by the heater, causes the piston to move back from its end position to its home position, thereby also causing the anchoring element to return to its home position. In contrast to the known prior art, the drilling tool according to the invention is characterized, inter alia, by the fact that the incorporation of additional pressure generating devices, such as pumps or an axial multi-piston swashplate pump, is eliminated, since the increase and decrease in the temperature of the pressure medium within an enclosed space is sufficient to ensure the mobility of the anchoring elements. The structural design of the drilling tool according to the invention is advantageously simplified as a result. The actuating means may also be embodied as a piston-cylinder assembly having two pistons, the outer ends of which, facing the anchoring elements, are coupled to the two ends of an anchoring element and can be extended parallel to one another as a result of heating of the pressure medium, for the purpose of parallel displacement of the anchoring element from the home position to the end position.

Added to this is the advantage that, in contrast to the prior art, the degree of outward extension of the anchoring elements can be controlled according to specifications, dependent upon the degree of heating of the pressure medium; the controlled extension of the anchoring elements may be desirable depending upon the type of rock formation, for example.

The application of force to the anchoring element, with which force the anchoring element is placed against the wellbore wall, can also be controlled according to preset specifications in a simple but advantageous manner, as will be described further below.

In a further embodiment of the drilling tool of the invention, at least three piston-cylinder assemblies can be arranged spaced equidistant from one another along one bracing plane in the direction of rotation in the external housing.

For the purposes of the invention, arrangement in the external housing is also understood as arrangement on the external housing.

In an additional embodiment of the drilling tool of the invention, four piston-cylinder assemblies can be arranged along one bracing plane in the external housing, at a center angle of 90° in the direction of rotation.

Arranging at least four piston-cylinder assemblies in the external housing and coupling at least four anchoring elements to the same preferably ensures easily controllable steering of the rotary drill bit.

With the drilling tool according to the invention, in contrast to the prior art, the extension of all the anchoring elements against the wellbore wall simultaneously by means of the four piston-cylinder assemblies not only provides the easily controllable steering of the rotary drill bit of the drilling tool of the invention, but also supports straight deep drilling without high expenditure on mechanical components and control mechanisms.

In another embodiment of the drilling tool of the invention, the actuating means in the form of piston-cylinder assemblies or linear drives may be arranged in two bracing planes in the vertical direction, for example aligned one above the other, in the external housing. Said actuating means may be arranged along the longitudinal center axis of the external housing, preferably perpendicular thereto. In an additional embodiment of the drilling tool of the invention, linear drives can likewise be arranged in two bracing planes in the vertical direction in such a way that the linear drives of one bracing plane may be arranged offset circumferentially from the linear drives of the other bracing plane, forming an offset angle of 45°, for example. If bracing devices are used in two bracing planes, the offset angles are advantageously half as wide as the angle of the distance between them.

Even if the linear drives with their associated bracing elements are located in two bracing planes in the external housing, the number of components is still much smaller than the number of components in the aforementioned prior art. The positioning of bracing devices in two bracing planes preferably also increases the efficiency of directional deep drilling using the drilling tool of the invention, which is essential in the case of very hard rock formations.

Moreover, by installing linear drives in two bracing planes, the number of movable components is likewise reduced substantially over the number of movable components installed as in the prior art, since only the linear drives require either a material that is expandable by temperature changes and/or a space filled with gas and/or liquid.

The simplification of the components to be used in providing the drilling tool of the invention results in the advantage that the return of the anchoring element from its end position to its home position is initiated quasi automatically, whereas in the prior art, the return of the anchoring element always requires an application of pressure to the reverse side of the piston or the engagement of a restoring spring.

In the embodiments of the drilling tool of the invention, it is particularly advantageous that the return of the anchoring element, i.e. the transition thereof from the end position to the home position, requires no monitoring, since this return always occurs without external intervention, whereas in conventional drilling tools, the return of the anchoring element requires additional monitoring due to the active external intervention.

With these additional advantages, even the most varied embodiments of the drilling tool of the invention are largely free of risk that the drilling tool may become jammed, which can occur when the anchoring element remains frictionally and/or non-positively connected to the wellbore wall, is sometimes observed in the prior art; in addition, in conventional drilling tools, the insufficient retraction of the anchoring element back to the home position due to faulty cooperation of the many components thereof results in poor alignment of conventional drilling tools during deep drilling.

Furthermore, experience has shown that a restriction of drilling tools to a few movable mechanical components results in the desired ruggedness of design and the reduced maintenance requirement, so that as a consequence, undisrupted continuous directional drilling at great depths is ensured with the drilling tool according to the invention.

In a further embodiment of the drilling tool according to the invention, the anchoring element extends over the length, preferably the entire length, of the external housing. The end of the anchoring element that faces the rotary drill bit can be coupled to the piston of the piston-cylinder assembly, while the other end of the anchoring element that faces away from the rotary drill bit can be articulated to the external housing. The end of the anchoring element that faces the rotary drill bit may also be bent at its tip in a curved or elbowed shape toward the rotary drill bit.

In an additional embodiment of the drilling tool according to the invention, the actuating means of the bracing device may also comprise a rod as the drive means, which is coupled at its outer end to the anchoring element and which contains a material as the pressure medium, a heating means optionally extending lengthwise through said material for the purpose of heating the material; the heating means, e.g. in the form of a film or mat or cuff, can likewise be additionally or alternatively placed with its entire surface against the rod containing the pressure medium, e.g. encasing said rod.

The bracing device can thus be embodied as having an actuating means, said actuating means being configured as a linear drive or linear motor which is capable of executing rectilinear or curved movements when exposed to temperature. The linear drive preferably includes at least one rod that contains a material, also called a solid material or solid, as pressure medium, e.g. an aluminum alloy, which is expandable linearly when exposed to heat. The rod is likewise provided with a heating means, which may encase the rod; when the material of the rod is heated, the rod undergoes significant linear expansion, and the linear expansion of the rod likewise causes the anchoring element, which is coupled, preferably articulated, to the rod, to be forced or moved outward, also called extension or movement, for force-loaded placement against the wellbore wall. The linear drive may also have two rods, aligned parallel to one another and spaced from one another, containing a heat-expandable material, also referred to as a solid material or solid, as a pressure medium, e.g. an aluminum alloy, the outer ends of said rods being coupled to an anchoring element. When the rods are heated, the rods undergo sufficient linear expansion to displace the anchoring element parallel to the external housing or to the center longitudinal axis thereof or to the bit drive shaft.

In a further embodiment of the drilling tool of the invention, the actuating means may also be embodied as dual-action and capable of accommodating at least two pressure media, so that advantageously, the anchoring element coupled to the actuating means can be extended toward the wellbore wall and into its end position by applying temperature to only one pressure medium, and said anchoring element can be moved, force-loaded, back toward the housing of the drilling tool of the invention and into its home position by applying temperature to the other pressure medium, after cooling or during the cooling of the first pressure medium. In a further embodiment of the drilling tool of the invention, the same pressure media or different pressure media may be used as pressure media for the dual-action actuating means. For instance, in the dual-action actuating means, the same solids, gases or liquids acting on the anchoring elements are preferably suitable for retracting and extending the anchoring elements, with these solids having the same or different coefficients of linear expansion, and these gases and liquids having the same or different coefficients of volume expansion.

In the dual-action actuating means for extending the anchoring elements, solids can likewise be used as pressure media for retracting the anchoring elements during the transition from the home position to the end position, while gases or liquids are used as pressure media during the transition from the end position to the home position, and vice versa.

Therefore, in one particular embodiment of the drilling tool of the invention, the actuating means may also contain different pressure media, which may be used dependent upon the requirements and specifications of the ground where drilling is planned, so that the high adaptability of the drilling tool of the invention to the requirements on site, in contrast to the prior art, is also utilized in this case to ensure the desired precise control of the drilling tool of the invention while simultaneously ensuring sufficient ruggedness of the drilling tool according to the invention. For example, the actuating means in the form of a dual-action linear drive may have, e.g. two rods, containing a heat-expandable material as pressure medium, e.g. an aluminum alloy, so that when temperature is applied to the one rod, the anchoring element coupled, preferably articulated, to said one rod is moved outward for force-loaded placement against the wellbore wall, and when temperature is applied to the second rod, the anchoring element coupled expediently to the second rod via deflection gearing or diverting pulleys is moved inward for force-loaded placement against the external housing of the drilling tool of the invention, or against indentations in the same. It is likewise possible for the one rod to be capable of automatically uncoupling itself from the anchoring element, and for the second rod to be capable of automatically coupling itself into or onto said coupling piece when said anchoring element reaches its end position, and for the one rod to be capable of automatically coupling itself back onto or into the anchoring element, and for the second rod, in contrast, to be capable of automatically uncoupling itself from said anchoring element when said anchoring element reaches its home position. For the purposes of the invention, articulated coupling is also understood as a conventional screw, bolt or pin connection, or a conventional bearing, such as a roller bearing, a radial bearing, an axial bearing, etc.

When temperature is applied to the pressure medium in the piston-cylinder assembly, the piston can be forced outward, radially to the longitudinal center axis of the external housing and in a continuously variable manner, far enough to pivot the anchoring element coupled to said piston about its coupling point and to press said anchoring element against the wall of the wellbore, forming an opening angle; the opening angle formed by this pivoting and delimited by the external housing and the anchoring element can measure from 0 to 45°, preferably from 0 to 30°, more preferably measuring 10°, 15° or 25°.

In another embodiment of the drilling tool of the invention, the outer ends of pistons of two piston-cylinder assemblies arranged one above or on top of the other are coupled to the two ends of the anchoring element. When exposed to a temperature, the anchoring elements move parallel to the longitudinal center axis of the external housing and/or the bit drive shaft or parallel to the external housing and are placed, force-loaded, with substantially their entire surface against the wall of the wellbore. This embodiment enables a full-surface stop of the anchoring elements. Furthermore, the engagement of the anchoring element in the surface of the wall of the wellbore can advantageously be controlled, if necessary, by the extension of said anchoring element according to preset specifications by the application of temperature in accordance with these specifications. This advantage also serves to provide precisely controlled, even slightly curved progression of deep drilling using the drilling tool of the invention. Full-surface, force-loaded placement of the anchoring elements may also be required depending upon the composition of the rock formation to be drilled through.

In a further embodiment of the drilling tool of the invention, liquids, such as oils, hydraulic oils and oil mixtures, are suitable for use as a pressure medium.

In other embodiments of the drilling tool of the invention, the pressure media are also embodied as solids, also called materials or solid materials, in which case the solids may have a coefficient of expansion, also called the coefficient of thermal expansion, which coefficient of linear expansion, e.g. at 0° C., 18° C. or 20° C., may be 1.5 to $30.0 \times 10^{-6} K^{-1}$, preferably 3.0 to $24 \times 10^{-6} K^{-1}$, more preferably 12.0 to $22.0 \times 10^{-6} K^{-1}$ or 10.0 to $18.0 \times 10^{-6} K^{-1}$. Suitable solids in this case include aluminum, copper, steel or alloys thereof, or mixtures of these alloys. The following solids having a coefficient of linear expansion, e.g. at 0° C., 18° C. or 20° C., which may also be denoted by the variable a, are advantageous, for example, $23.1 \times 10^{-6} K^{-1}$, e.g. aluminum, $28.9 \times 10^{-6} K^{-1}$, e.g. lead, $13.4 \times 10^{-6} K^{-1}$, e.g. nickel, $11.8 \times 10^{-6} K^{-1}$, e.g. iron, $8.6 \times 10^{-6} K^{-1}$, e.g. titanium, $30.2 \times 10^{-6} K^{\times 1}$, e.g. zinc, and $16.5 \times 10^{-6} K^{-1}$, e.g. copper. For the purposes of the invention, the coefficient of expansion may also be understood as a coefficient of linear or thermal expansion. The coefficient of linear expansion, which may also be denoted as $\alpha$, may have a unit of 1/K and may indicate the fraction by which the length of, e.g. a rod-shaped body can elongate or expand at a predefined temperature, e.g. 0° C., 18° C. or 20° C., etc., e.g. under a temperature increase, e.g. of 1K (=1° C.). This may be at least principally dependent on temperature and pressure as a material constant. For the purposes of the invention, the coefficient of expansion may also be understood within the context of the invention to mean a coefficient of spatial expansion, a coefficient of cubic expansion or a coefficient of volume expansion; for example, the coefficient of expansion as a coefficient of linear or longitudinal expansion, i.e. $\alpha$, at 0° C. or 18° C. or 20° C., may be from 1.5 to $30.0 \times 10^{-6} K^{-1}$, preferably from 3.0 to $24 \times 10^{-6} K^{-1}$, more preferably from 10.0 to $18.0 \times 10^{-6} K^{-1}$. In one embodiment of the drilling tool according to the invention, the coefficient of linear expansion $\alpha/(10^{-6} K^{-1})$ or $\alpha \times 10^{-6}/°C.^{-1}$ of solids, e.g. at 0° C., may be 1.5-32.0, in particular 2.0-28, more preferably 3.0-25, e.g. at 18° C. or 20° C. The coefficient of linear expansion, i.e. $\alpha$, (in $10^{-6}/K$ or $10^{-6}/K^{-1}$), e.g. between 0° C. and 100° C., may also be from 1.5 to 32.0; in particular from 1.8 to 30.0 or from 2.0 to 28, even more preferably from 3.0 to 25.

As the pressure medium, which may contain one or more solids, aluminum, steel, cast iron, brass, aluminum alloys, nickel, magnesium oxide, nickel alloys, etc. may be used. For instance, solids having a coefficient of linear expansion $\alpha/(10^{-6} K^{-1})$ or a coefficient of linear expansion $\alpha$ ($\times 10^{-6} K^{-1}$) or a coefficient of linear expansion $\alpha$ in $10^{-6} K^{-1}$, such as lead with 31, zinc alloys with 24-28, tin with 23.0, brass with 17.5-19.1, bronze with 16.8-18.8, austenitic steel with 16-17.0, copper with 16.8, nickel alloys with 11-18, ferritic steel with 10.5-13.0, cast iron with 9-12, etc. (in particular for 0 . . . 100° C.) may be used.

It has been found that, particularly in the embodiments of the drilling tool of the invention in which bodies, also called pressure media, containing solids are used, when temperature is applied to the pressure medium, consisting of metal, liquid or gases, the anchoring elements are always capable of returning fully from their end position to their home position, regardless of the number of transitions or cycles, so that the residual elongation of the shape-memory alloys (SMA) observed as a particular disadvantage in conventional steerable rotary drilling systems that use SMA alloys is no longer observed. Because the anchoring elements return completely from the end position to the home position, monitoring of the drilling tool according to the invention and/or of the pivoting of the anchoring elements and the degree thereof is unnecessary.

It has also been found that, with the drilling tool according to the invention, as the anchoring elements are being returned to their home position, the pressure medium is still able to work, in contrast to the bracing elements, also called anchoring elements, actuated by strands of shape memory alloy (SMA), of the bracing devices of the conventional steerable rotary drilling system, and therefore, there is no impairment of the return pivoting of the anchoring elements of the drilling tool of the invention, and as a result, the steering of the drilling tool of the invention by means of the anchoring elements occurs reliably, to the extent said steering is desired.

In a very different embodiment of the drilling tool of the invention, compounds, e.g. having a coefficient of linear expansion $\alpha/(10^{-6} K^{-1})$ (or $\alpha$ in $10^{-6} K^{-1}$) of 30.0 to 50.0, preferably of 35.0 to 45.0 (at 20° C. or 18° C.) can likewise be used in the actuating means. For instance, compounds having a coefficient of linear expansion $\alpha$ in $10^{-6} K^{-1}$ (or $\alpha/(10^{-6} K^{-1})$) of 40.0 at 20° C. or 18° C., e.g. NaCl compounds, are also suitable as a pressure medium in the actuating means of the bracing devices of the drilling tool of the invention.

In additional embodiments of the drilling tool according to the invention, materials known as memory metals are suitable as solids. The memory metals used as solids are likewise known to a person skilled in the art, and may contain alloys with, e.g. 52 to 57% nickel, optionally a small percentage of cobalt, with the remainder made up of titanium, which are able to return to their original shape following deformation at high temperatures and at low temperatures. Such memory metals are also suitable, in particular, for the anchoring elements of the bracing devices, in the form of rods, for example, in which case, when heat is applied to the rods, the rods undergo linear expansion, radially to the longitudinal center axis of the external housing or to their longitudinal center axis, thereby placing the anchoring elements outward, against the wellbore wall. These specific embodiments of the drilling tool of the invention require very little space in the external housing. For the purposes of the invention, the external housing may also be understood as the housing of the drilling tool according to the invention.

In other embodiments of the drilling tool of the invention, metal alloys can also be used as solids, as well as bimetal materials, provided they have a sufficient coefficient of linear expansion or coefficient of thermal expansion that is known to a person skilled in the art. For the purposes of the invention, the coefficient of thermal expansion is also understood as a material constant that describes the reaction of the solid when the solid is exposed to a change in temperature.

Also suitable as pressure media are liquids, in particular solutions, oils or oil mixtures, that have a coefficient of thermal expansion or coefficient of volume expansion that is sufficient to place the anchoring elements against the wellbore walls. Since liquids used as pressure media are generally advantageously able to expand more than solids when heated, liquids are likewise suitable for use in the piston-cylinder assembly as actuating means for the bracing device. In this case, the coefficients of volume expansion, also denoted by $\gamma$, may range from 5.0 to $20.0 \times 10^{-4}$, preferably from 7.2 to $16.3 \times 10^{-4}$, even more preferably from 12 to $15 \times 10^{-4}$, (in 1/K or 1/° C.), e.g. at 18° C. or at 20° C. Liquids, which have coefficients of cubic or volume expansion, which can be much greater than the coefficient of linear expansion of solids, are advantageously likewise suitable as the pressure medium, which may have a coefficient of volume expansion, such as $\gamma/(10^{-3} K^{-1})$ or $\gamma$ (in $10^{-3} K^{-1}$), ranging from 0.4 to 2.0, preferably from 0.2 to 1.5. Thus, liquids having a coefficient of volume expansion $\gamma$ in $10^{-3} K^{-1}$ of 0.52, e.g. glycerol, of 0.7 or 0.65, e.g. mineral oil, of 0.7, e.g. polyglycol-water solution or mixtures thereof, e.g. at 0° C., 18° C. or 20° C., are also suitable for use as the pressure medium in the actuating means of the bracing devices of the drilling tool of the invention. Pressure media in combinations of solids and/or liquids can likewise be used in the actuating means. The liquid, which may have a coefficient of volume expansion γ in $10^{-3} K^{-1}$ at 18° C. of between 0.5 and 2.0, in particular between 0.72 and 1.63, more preferably between 1.2 and 1.5, is suitable in particular as a pressure medium in the actuating means embodied as a piston-cylinder assembly in the drilling tool according to the invention.

Also suitable as the pressure medium in additional embodiments of the drilling tool of the invention are, for example, gases, e.g. helium and nitrogen, which are preferably characterized by a much higher coefficient of volume expansion than the aforementioned, also referred to as the coefficient of volume expansion or the coefficient of isobaric volume expansion. The coefficient of isobaric volume expansion for gases, as denoted by γ, may be, e.g. at 18° C. or 20° C., 3.0 to $4.0 \times 10^{-3} K^{-1}$ (or $\gamma \times 10^3 /° C.^{-1}$), preferably 3.3 to $3.8 \times 10^{-3} K^{-1}$ (or $\gamma \times 10^{-3} /° C.^{-1}$), 3.5 to $3.7 \times 10^{-3} K^{-1}$ (or $\gamma \times 10^{-3} /° C.^{-1}$), preferably $3.41 \times 10^{-3} K^{-1}$ (or $\gamma \times 10^{-3} /° C.^{-1}$). Thus, gases having a coefficient of isobaric volume expansion of $3.68 \times 10^{-3} K^{-1}$ (or $\gamma \times 10^{-3} /° C.^{-1}$), and very particularly, nitrogen or helium or mixtures thereof, are also suitable for use as pressure medium in the actuating means of the bracing devices of the drilling tool according to the invention. Pressure media in combinations of solids and/or liquids can likewise be used in the actuating means.

In additional embodiments of the drilling tool of the invention, conventional composite materials are likewise suitable as the pressure medium, provided these materials generate the forces necessary for the radial movement of the anchoring elements, for example materials composed of two or more materials layered one above the other and/or interleaved, e.g. with metal alloys, layered composites, impregnated composites or structural composites, and/or also particle composites or mixtures thereof. At least in one region of the side of the cylinder that faces the cylinder space, or even over the entire surface of said side, at least one heating means operable by means of electric current is provided. Suitable heating means include, for example, heating rods, heating films, heating sleeves and/or heating jackets, which are preferably located within a cylinder space and which can be placed fully or partially against a cylinder, e.g. on the inside and/or the outside thereof, for example encasing the cylinder. The heating means can also be located within the rod that contains the solid material as the pressure medium. At least in one region of the side of the cylinder that faces the cylinder space, or even lining the entire surface of the cylinder space, at least one heating means for heating the pressure medium in the cylinder or cylinder space may be provided. Heat outputs of the heating means used for applying temperature are well known to a person skilled in the art.

In a further embodiment of the drilling tool according to the invention, the anchoring elements may have a sawtooth shape on their external surface to increase the force-loaded engagement of the anchoring elements against or into the wall of the wellbore. Optionally, the anchoring elements may also be curved outwardly to keep them from becoming snagged on the wall of the wellbore.

The heating means are run on electric power via conventional power cables. In one embodiment of the drilling tool of the invention, the electric power may be supplied as electric current by energy sources embodied as batteries and/or may be generated by inductive coupling with multiple charging coils. It is likewise possible for the source supplying the electric power to be a source that uses a turbine activated by the drilling fluid flow, which drives an electric generator. In one embodiment of the drilling tool of the invention, the batteries can also be charged with the electric power generated by the generator, so that the drilling tool of the invention can be used cost-effectively for continuous directional drilling, without intervention from above ground.

In one embodiment of the drilling tool according to the invention, when deviations occur, the output variables or manipulated variables that have been modified from the specified target values of the control device are fed in the form of signals by the measured-value processor to the switch, and the switch actuates either an on/off switch for applying temperature to the pressure medium, or a regulator for the preferably continuously variable application, according to specifications, of temperature to the pressure medium, in order to supply electric power to the heating means in the bracing devices. The regulator can apply electric current to the heating means for a predetermined period of time and/or can apply a measure of electric current, i.e. a predetermined current intensity, so that the transitioning of the anchoring elements and the actuating means from the home position to the end position can advantageously be preset in terms of time and/or in terms of a specific degree of extension thereof, e.g. forming a specified angle, and/or so that the anchoring elements or actuating means can be extended only by a preset amount from the home position toward the end position, based upon the specifications or requirements of the wellbore diameter, the rock, etc. during deep drilling. In one embodiment of the drilling tool according to the invention, an increasing temperature can also be applied to the pressure medium by control of the regulator, e.g. dependent upon the pressure measured by a pressure sensor in the cylinder space and/or dependent upon the composition of the rock formation, since the regulator is able to supply electric power to the heating device in a continuously variable manner, so that the pressure medium located in the chamber or the cylinder space of the bracing device can advantageously be heated according to preset specifications. For the purposes of the invention, drilling fluid is also understood as drill flushing fluid.

The bit drive shaft is mounted rotatably in the housing or external housing of the drilling tool according to the invention. The rotary movement of the bit drive shaft can be generated by means of a drill pipe string coupled to the bit drive shaft and/or by a drive located inside the housing. The end of the bit drive shaft that protrudes from the external housing or housing is thus coupled to the rotary drill bit. The other end of the bit drive shaft that protrudes from the external housing or housing or is located therein is thus coupled to the drill pipe string. The rotary drill bit, as is known to those skilled in the art, can be rotated by a hydraulic drive motor, for example a Moineau motor, housed in the upper region of the housing or external housing of the drilling tool of the invention, the rotor of said motor being driven in response to the pressurized drilling fluid flowing downward therethrough. The drill pipe string is advantageously coupled to the upper end of the bit drive shaft. In another embodiment of the drilling tool according to the invention, the bit drive shaft, mounted rotatably in the external housing, is coupled at its end that faces away from the rotary drill bit to the drill pipe string in the upper region of the drilling tool according to the invention, preferably outside or inside of the housing or external housing.

Also located within the external housing, also called the housing, is a control device for actuating the bracing devices. The control device may comprise one or more electronic sensor systems along with one or more electronic measured-value processors. Suitable sensor systems also include sensors for measuring the pressure in the cylinder space of the piston-cylinder assembly and for determining the pressing force acting on an anchoring element. Also connected to the output of the control device are the inputs of switches, the outputs of which may be connected to the inputs of the heating device of the bracing devices. The measured-value processors may include conventional regulators having one or more control loops for multivariable control. Determining the pressing force may be necessary, e.g. when drilling through loose layers in rock formations. The measured-value processors are suitable for processing the data from the sensor systems and for actuating the bracing devices by supplying them with electric power according to the all-or-nothing principle or by supplying them with steplessly increasing amounts of electric power. For the purposes of the invention, data may also be understood as measured variables, manipulated variables, output variables, signals, pressure signals, acoustic pulses, control signals, etc.

It is likewise possible for the sensor systems to generate data, such as position data, or to additionally or alternatively generate other measured values for the drilling tool according to the invention, which can then be compared in the measured-value processor with specified target values.

As a person skilled in the art is aware, the conventional control device may comprise a sensor system, which may also include the magnetic field sensors and/or a programmable measured-value processor, etc., and these may be connected to one another for the purpose of forwarding, exchanging and/or processing data and/or signals; for the purposes of the invention, connection is also understood as a conventional electrical connection for control purposes, e.g. among the magnetic field sensors, the control connection, the bracing device and the actuating means for the purpose of exchanging or at least forwarding data, measured values or signals; for the purposes of the invention, a control device is also understood as a conventional control device equipped with a programmable sensor system, a programmable measured-value processor, etc., which are well known to those skilled in the art. The connection may be wireless, wired, ultrasonic, infrared, a data communication connection via Bluetooth, etc. in analog and/or digital form and/or encoded.

In one embodiment of the drilling tool according to the invention, the sensor systems of the control device of the drilling tool of the invention, additionally in the form of magnetic field meters, also called magnetic field sensors, for determining directional and positional values based upon the geomagnetic field and inclinometers for determining, e.g. inclination and wellbore incline, as described in DE 199 50 040, may be located in the external housing, in which case for regulating and controlling the bracing devices, a control loop for multivariable control, to which the control variables for inclination and for direction and the extent thereof may be supplied and in which these control variables can be compared with the specified target values for inclination and direction, may be implemented in the measured-value processor. When deviations occur, the modified output variables or manipulated variables of the control device serve as signals, which can be forwarded to the bracing devices in the form of electric power for heating the pressure medium via a switch. In control loops for multi-loop control, the measured-value processors of the control device, which typically includes regulators, can compare the measured variables transmitted by the sensor systems as control variables with the target values defined by command variables and, if the control variables deviate from the target values, can use these values to calculate the manipulated variables, possibly increasing them, and the bracing devices or, e.g. the linear drives thereof, as actuating drives of the adjustment elements, can receive these variables for setting the manipulated variable.

The specifications prevent distortions between the inclination measurement and the direction measurement for the drilling tool according to the invention, and cause the inclinometers and the magnetic field meters to be coupled to one another via the control loop for multivariable control in such a way that the trouble-free control and adjustment of the programmed target inclination and target direction of the drilling tool of the invention are advantageously ensured, enabling the specified target values for inclination and direction to be maintained during continuous operation. For continuously path-oriented drilling at great depths, magnetic field meters for measuring in three spatial directions are suitable for unambiguously determining the precise position of the external housing and consequently that of the drilling tool according to the invention in the geomagnetic field as the reference, and the inclination sensors. The signals corresponding to the modified output variables of the control device with regulators and generated in the measured-value processor are forwarded to an on/off switch, which, in the on position, supplies the bracing devices with electric current for heating the pressure medium, and in the off position, interrupts the supply of electric current. Based upon the specified target values for inclination and direction and the modified output variables, the degree and duration of the application of force generated by the bracing device can be controlled by the duration of heating.

In one embodiment of the drilling tool according to the invention, the magnetic field sensors and inclination sensors located within the external housing are arranged for determining directional values based upon the geomagnetic field, in which case for controlling the bracing devices and the piston-cylinder assemblies thereof, a control loop for multivariable control is provided in the control device, with the control variables, such as inclination and direction from the inclinometers and the magnetic field meters, being fed to said control loop as data, also called measured values or measured variables, and in the control device or by the measured-value processor thereof, these control variables are compared with the specified target values, such as inclination and direction, as target values, and if deviations are detected, the modified output variables or manipulated variables can be forwarded in the form of signals from the control device or from the measured-value processor thereof to a switch, in particular to an on/off switch for applying temperature to the pressure medium and/or to a regulator for applying temperature to the pressure medium in the bracing devices in a continuously variable manner by the supply of electric power thereto.

In further embodiments of the drilling tool of the invention, suitable additional sensor systems include conventional inclination sensors and magnetic field sensors, but also acceleration sensors, gamma radiation sensors, gyroscopic sensors and/or other WOB sensors used for determining the precise position of the drilling tool according to the invention at a specific point in time.

With the direct and active control of the bracing devices via the control device installed in the external housing, the position data supplied by the sensor systems correspond to real-time position measurements taken while the drilling tool of the invention is rotating and operating underground. In the drilling tool of the invention, the sensor systems and the electronic control device connected thereto ensure the continuous measurement of azimuth and of the current inclination angle as deep drilling progressively advances, so that corrective measures can advantageously be implemented immediately in real time by the drilling tool of the invention, using its temperature-controlled bracing devices, without interrupting the deep drilling process, in contrast to the prior art.

The processing of the position data, generated and forwarded by sensor systems, in the control device, independently of an above-ground control console or control center and using the control loop for multivariable control which is implemented in the control device enables precisely synchronized, path-controlled and speed-controlled directional drilling using the drilling tool according to the invention, advantageously provided by way of the temperature-controlled bracing devices, even when only slight changes to the deep drilling process occur.

Due to the substantial simplification of the operating method, involving rapid and expedient cooperation between the control of the drilling tool according to the invention and the temperature-controlled anchoring elements of the bracing devices, which are easily controlled via actuating means for placement against the wall, external intervention via an above-ground control console is unnecessary during operation of the drilling tool of the invention because the position data from the electronic sensor systems are processed in real time during drilling, and once these have been processed in the control device, the control device and the easy-to-operate but effective temperature-controlled bracing devices are able to intervene actively and directly, in precise synchronization, into the drilling process.

Disadvantages of the aforementioned prior art, such as the need to monitor the control of the return of the anchoring elements to their home position, for example by pressurization, or the need to check the hydraulic systems used to apply force to the anchoring elements, are avoided.

The simplification of the structure of the drilling tool of the invention over that of the aforementioned prior art by the elimination of the additional monitoring of the return of the anchoring elements to their home position and of the checking of pump systems or spring systems for returning the pistons to their home positions, and the prevention of jamming of the drilling tool that may result from the failure of anchoring elements to fully engage in the home position are further particularly advantageous characteristics of the drilling tool of the invention.

Although the simple extension of anchoring elements from the home position up to a stop in the end position, heretofore routine practice in the prior art, is also implemented by the drilling tool according to the invention with its temperature-controlled anchoring elements, the temperature-controlled anchoring elements can also be extended into predefined positions and acted upon by a predefined force, dependent upon the composition and hardness of the rock in the geologic formation to be drilled.

Since the bracing devices with the anchoring elements also require much less space in the external housing of the drilling tool according to the invention, it is also possible to position bracing devices in two bracing planes and to employ these bracing devices alternatingly during operation, so that the maintenance-free periods of operation for the drilling tool of the invention are increased substantially over those of the prior art. For instance, it is advantageous for the piston-cylinder assemblies to be arranged in two bracing planes, aligned one on top of the other in the vertical direction, or to be offset 45° in the circumferential direction from those of the other bracing plane.

Placing the anchoring elements in two offset planes on one side also allows the external housing to be acted on by a substantially greater force if necessary, so that the degree of curvature of path-oriented drilling can be achieved more rapidly with respect to inclination angle and azimuth than in the prior art.

Furthermore, the drilling tool according to the invention and the control device thereof can also be connected via cables running along the drill pipe string to an above-ground control console. For the purposes of the invention, connected is also understood to mean an electrical connection for the purpose of conducting electric signals and/or electric current. Thus, the data acquired by the sensor systems and/or measured-value processors of the control device, in particular target values and measured variables, are or can be forwarded, e.g. as actual values, manipulated variables, signals, etc., such as position data, to the above-ground control console via the cable located in the drill pipe string. In addition, the data acquired by the sensor systems of the control device are or can additionally or alternatively be forwarded to the above-ground control console by means of telemetry and/or in the form of pressure signals and/or pulses, such as sound waves. The supply of electric power can likewise be provided via cable. Conversely, the above-ground control console may also forward target values or target value specifications and other data, such as measured variables, e.g. as actual values, manipulated variables, signals, etc., such as position data, to the drilling tool according to the invention and its control device via cable and/or by means of telemetry and/or pressure signals and/or pulses, such as sound waves.

The drilling tool according to the invention is likewise suitable for connection of its control device to the above-ground control console by generating pressure pulses, allowing information to be easily provided via the flushing channel running through the drill pipe string, as disclosed in DE 10 2008 063 940. In this embodiment, the drilling tool of the invention may have a device for generating pressure pulses for the purpose of transmitting information within the flushing channel of the drill pipe string, which is connected to the control device, said pulse-generating device comprising an impeller, which is acted on by the drilling liquid and which drives a generator to which an accumulator is connected; in this case, the generator including the accumulator, the coupling and the bearing of the impeller shaft is disposed in an axially extending housing, which is filled with oil and forms a cylindrical annular gap in relation to the drill pipe string, and the drilling liquid flows through the annular gap for driving the impeller; above an oil reservoir in the housing, a pressure compensating piston is provided, which is acted on by the drilling liquid, and the seal provided at the lower end between the housing and the impeller shaft is embodied as a smooth running seal, e.g. a lip seal or a ceramic seal.

In a further embodiment of the drilling tool according to the invention, the pressure pulses may be transmitted in flowing media for the transmission of information to the control device, in particular during the production of bores during underground mining and tunneling, through the flushing channel of the drill pipe string, in which case an impeller is disposed in the flushing channel of the drill pipe string and can be switched between generator and motor operation, and can therefore be operated alternatingly. In this case, the impeller with the coils that are assigned to the drill pipe string can have correspondingly mounted magnets. The coils can be connected to energy accumulators, with the coil wheel advantageously being disposed axially. In addition, the impeller may be mounted on guides that are supported against the inner wall of the flushing channel of the drill pipe string, as disclosed in DE 41 34 609.

In another embodiment of the drilling tool according to the invention, information may be transmitted from the control device via the drill pipe string within the same by means of pressure pulses in a flowing liquid, preferably called drilling liquid or drilling fluid, in which case the drilling tool of the invention comprises a device, connected to the control device, for transmitting the information, in particular during the production of bores, by means of pressure signals in flowing liquid, preferably drilling liquid; the device includes an information generating means, a transmitting device connected to the information generating means and designed for generating the pressure pulses in the liquid, and a receiving device for receiving and analyzing the information transmitted by means of the pressure pulses in the control console, the transmitting device including a resilient flow resistor in the liquid stream and an actuating means for modifying the flow cross-section of the flow resistor in synchronization with the pressure pulses to be generated, as disclosed in DE 196 07 402.

For generating the pressure pulses, the transmitting device may have a resilient flow resistor in the liquid stream and an actuating means for controlling the flow cross-section of the flow resistor in synchronization with the pressure pulses to be generated. The advantage of this transmission is its compact and cost-saving design along with the low-wear and low-energy nature of pressure pulse transmission, and although the moving parts are easily replaced, flawless transmission of the information is ensured. With this measure, a flow resistor having a variable flow cross-section is located in the liquid stream or in the drilling liquid stream. By adjusting the flow cross-section of the flow resistor, pressure pulses can be generated in the direction of flow in the region of the flow resistor and behind said flow resistor, and these pressure pulses can be propagated in the direction of flow of the liquid stream or the drilling liquid stream. These pressure fluctuations or pressure pulses can be reduced, so that when the flow cross-section is reduced and the flow of liquid remains the same, the flow velocity around the flow resistor increases and as a result, the liquid pressure decreases to an extent. A reduction in the flow cross-section therefore leads to a partial increase in pressure in the liquid stream. In this way, pressure fluctuations or pressure pulses can be generated in a targeted manner in the liquid stream. Due to the resiliency of the flow resistor, this generation is reproducible, with the aforementioned process being repeatable as often as desired and nearly without wear. Moreover, the response times of the resilient flow resistor are advantageously short enough that clean rising and falling edges of the pressure pulses can be generated. In this way, undisrupted information transmission continues to be possible, because the edge steepness of the generated pressure pulses is sufficient to actuate subsequent, for example digital analysis devices.

Finally, in another embodiment of the drilling tool according to the invention, the control device of the drilling tool is connected to a device for transmitting information within the drill pipe string by means of pulses, such as sound waves; a transmitting device for generating the pulses may be connected, for example switched, to an information generating device, e.g. sensor systems of the control device, connected downstream of the rotary drill bit, in which case the device likewise comprises a receiving device for receiving and analyzing the information transmitted via pulses, and the pulses generated by the transmitting device are embodied as sound waves and are forwarded to the receiving device, as disclosed in DE 10 2012 004 392. The sound waves may be triggered by means of mechanical, hydraulic, electrical and/or pneumatic pulses.

In contrast to the prior art, the drilling tool according to the invention and the method according to the invention are characterized, inter alia, by the absence of residual expansion, and therefore, no increase in residual expansions based on the number of transitions, no loss of alignability and controllability of the bracing devices, and no costly backing out, replacement and reintroduction necessitated by defective anchoring elements, continuous actuability of the bracing devices, elimination of the additional monitoring of the pivoting of the anchoring elements, low maintenance costs during continuous drilling operations, continuously variable adjustability of the anchoring elements according to inclination and/or azimuthal specifications, force-loaded transition of the anchoring elements from the end position to the home position, and low structural complexity.

DETAILED DESCRIPTION

Exemplary Embodiments

Figure 1:
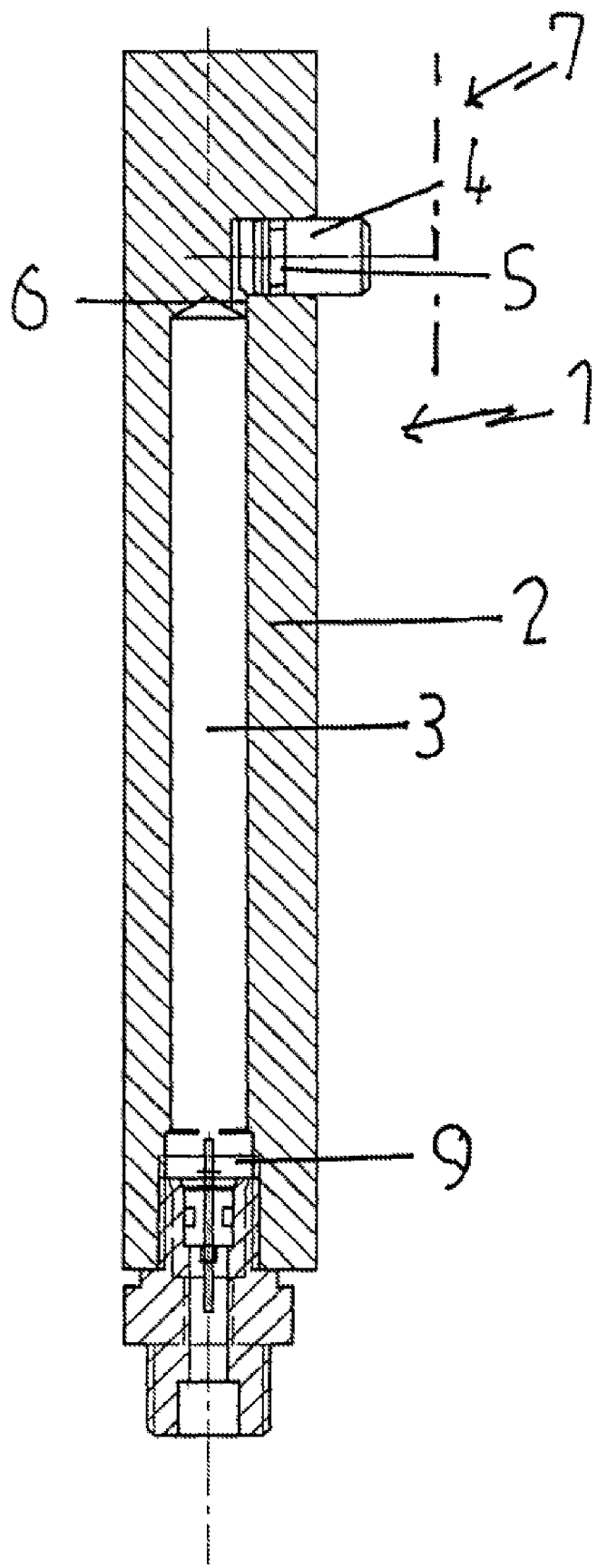
FIG. 1 illustrates a cross-section of a bracing device of a drilling tool in accordance with the principles described herein.

In the interest of diagrammatic simplicity, the drawing schematically illustrates, greatly enlarged and not to scale, in FIG. 1 a cross-section of a bracing device of the drilling tool according to the invention, having a piston-cylinder assembly with a piston located in the home position.

The bracing device comprises a piston-cylinder assembly 1 as an actuating means. The bracing device is arranged and supported in a housing or external housing of the drilling tool according to the invention (not shown). A piston 4 of piston-cylinder assembly 1 is in its home position within a cylinder space 5. The cylinder space 5 extends transversely to the longitudinal center axis of piston-cylinder assembly 1. Cylinder space 5 is connected via a channel 6 through which pressure medium may flow to a chamber 3 of a chamber housing 2, in which the pressure medium can be heated and cooled.

At the bottom end of chamber 3 facing away from the cylinder space 5, a heating means 9 is located; heating means 9 is positioned on at least a portion of the inner and/or outer walls of chamber housing 2 for the purpose of heating the same. The heating means of the bracing device is connected on the input side to the output of an on/off switch, which is activated by the control device. When the on/off switch is in the on position, the heating device is supplied with electric power, supplied by means of a generator for generating an electric current, located in the housing, for the purpose of heating the pressure medium. In another exemplary embodiment, heating means 9 is supplied via power cables with the electric current, supplied via the on/off switch, from batteries and/or from an electric generator, which is powered by a turbine driven by a drilling fluid stream via the control device, for the purpose of heating pressure media, and is actuated via the on/off switch. When the on/off switch is in the off position, the heating means is not supplied with electric current. At the upper end of chamber 3, facing the cylinder space 5, channel 6 is located, connecting chamber 3 of chamber housing 2 with cylinder space 5 so as to permit the passage of pressure medium. Piston 4 can be activated in cylinder space 5. Chamber 3 and cylinder space 5 are filled with an oil mixture as the pressure medium, which has a coefficient of thermal expansion, i.e. coefficient of volume expansion, γ at 18° C. of $5.0\times10^{-4}$ or in other exemplary embodiments of $16.0\times10^{-4}$ or $18\times10^{-4}$ (in 1/K or 1/° C.), or which has a coefficient of volume expansion, γ at 18° C. of 0.52 (γ in $10^{31}$ $^3K^{-1}$), containing glycerol. In further exemplary embodiments, helium or nitrogen is used as the pressure medium.

When the pressure medium is acted on by temperatures of 125° C., 150° C., 175° C., 210° C. or 255° C. or even higher than these temperatures, the pressure medium is expanded until the piston 4 in cylinder space 5 is forced outward from its home position to its end position (not shown). The one outer end of piston 4 is coupled, preferably articulated, to anchoring element 7, so that when piston 4 is forced outward in its transition from its home position to its end position, anchoring element 7 is likewise pivoted outward to be placed, force-loaded, against the wellbore wall (not shown). When the pressure medium is heated, piston 4, which is in the home position before the pressure medium is heated, is moved, i.e. displaced, outwardly in cylinder space 5 toward the wellbore wall, radially to the longitudinal center axis of the housing or to the bit drive shaft, i.e. transversely to the longitudinal center axis, thereby placing anchoring element 7, force-loaded, against a wellbore wall during the transition of said piston from the home position to the end position. When the pressure medium is chilled or cooled, piston 4, which is located in the end position, is displaced in the opposite direction, this time toward the longitudinal center axis of the housing or the bit drive shaft, radially to the longitudinal center axis of the housing or the bit drive shaft, thereby placing anchoring element 7 against the housing or against the outer side thereof during the transition from the end position to the home position.

The other end of anchoring element 7, facing away from the rotary drill bit, is coupled, preferably articulated, to the external housing via a spring, such as a coil spring or disk spring, wherein the guidance of the opposite end of the anchoring element 7 by means of a rod-shaped pin (not shown), aligned radially to the external housing and coupled thereto, effectively supports parallel displacements of anchoring element 7 to the external housing or to the center longitudinal axis of the same or to the bit drive shaft. When piston 4 is forced outward as a result of the application of heat to chamber 3 and/or cylinder space 5, anchoring element 7 is moved outward radially to the longitudinal center axis of the external housing or to the bit drive shaft and parallel to the longitudinal center axis of the external housing or to the bit drive shaft from its home position to its end position.

If necessary, the force-loaded placement may be dependent upon a specified duration, without the occurrence of additional mechanical stress, for example during pump operation, in contrast to the conventional prior art. From the end position, anchoring element 7 and piston 4 can be returned to their respective home positions as a result of the cooling or the interruption of the heating process of heating means 9. The repeated retractions and extensions of piston 4 and anchoring element 7 occur with low wear, since only piston 4 is moved in cylinder space 5, in contrast to the prior art, which requires a multiplicity of mechanical moving parts not only to enable the time-dependent application of force but also to enable the return of the components once the application of force is completed. The heating means may be located in chamber 3 and/or may be positioned in the region around cylinder space 5.

In another exemplary embodiment (not shown), the bracing device is formed with an actuating means, embodied as a rod having a heat-expandable material, also called a solid or solid material, as a pressure medium, which may be an aluminum alloy, e.g. having a coefficient of linear expansion α in $10^{-6}K^{-1}$ of 23.1 at 20° C., in which case the rod is likewise provided with a heating means, for example is encased by said heating means. When the material of the rod is heated, the material undergoes significant linear expansion, so that the linear expansion of the material likewise forces or moves the anchoring element 7 coupled to the rod outward from the home position to the end position, for the force-loaded placement of said anchoring element against the wellbore wall.

Furthermore, in an additional exemplary embodiment of the bracing device that includes the rod with the solid material, in addition to controlling the duration of heat application to the rod, the extent of the application of temperature to the rod can also be controlled, dependent upon the specific requirements of the underground rock formation and the degree of curvature of the wellbore to be described (not shown), by means of a regulator, the input of which is connected to the output of the control device.

In an additional exemplary embodiment (not shown), the bracing device is formed with an actuating means that comprises two rods, aligned parallel to one another and spaced apart from one another and containing the heat-expandable material as the pressure medium, e.g. aluminum alloy, e.g. having a coefficient of linear expansion α of 23.1 at 20° C., the outer ends of said rods being coupled to anchoring element 7 for the parallel displacement thereof as a result of the application of a temperature to the pressure medium; for the purposes of the invention, an application of temperature may also be understood as the application of a low temperature to the pressure medium for the purpose of cooling the same and the application to the pressure medium for the purpose of heating the same.

In a further exemplary embodiment (not shown), the chamber can likewise be connected to two cylinder spaces 5, each having one piston 4, so that the two pistons 4 of cylinder spaces 5 are capable of moving an anchoring element 7 parallel to the longitudinal center axis of the external housing from the home position to the end position against the wellbore wall and back again, without the need for additional expenditure on mechanical parts, in contrast to the prior art. The cylinder spaces 5 are connected via a channel 6 to a chamber 3 so as to allow the passage of pressure medium, said chamber having a heating device 9, the input of which is connected to the output of an on/off switch, which is actuated by the control device. The pressing force with which anchoring element 7 is placed, force-loaded, against the wall of the wellbore can also be determined and continuously monitored by sensor systems arranged in cylinder space 5 or chamber 3, so that this control is also carried out in real time, without external intervention.

In another exemplary embodiment (not shown), piston-cylinder assembly 1 is embodied as a dual-action assembly, and the mutually opposing piston surfaces thereof can be acted on by pressure media, the temperature of which is controlled via the heating means located in the two opposing cylinder spaces 5; in a refinement of the exemplary embodiment, each of the two cylinder spaces 5 can be connected to a chamber 3 of a chamber housing 2 via a channel 6 through which pressure medium is able to flow; each chamber 3 has a heating means, so that the pressure media can be heated only outside of the cylinder spaces 5, which preferably have no heating means, in the chambers 3, which may be spaced apart from the cylinder spaces 5. When the pressure medium in the one cylinder space 5 and/or in the one chamber 3 is heated, the piston 4 and the anchoring element 7 coupled thereto are moved from the home position to the end position, while the other pressure medium in the other cylinder space 5 and the other chamber undergoes no heating, and more preferably is cooled; when the other pressure medium in the other cylinder space 5 and/or the other chamber 3 is heated, the piston 4 and the anchoring element 7 coupled thereto are forced from the end position to the home position, while the pressure medium in the first cylinder space 5 and/or the first chamber 3 undergoes no heating, and is advantageously cooled. This exemplary embodiment is also suitable for a predefined, partial extension and retraction of the piston 4; only a portion of piston 4 is forced out of and/or moved back into the cylinder space 5 without the piston 4 and the anchoring element 7 coupled thereto reaching the end position.

The invention relates to a low-maintenance, operationally reliable drilling tool for undisrupted continuous operation for the sinking of bores into underground rock formations with specification of a selectable directional path for the wellbore, comprising a tubular housing, the upper end of which can be coupled to a non-rotatable drill pie string, a bit drive shaft which preferably rotates in the housing and which bears a rotary drill bit at its end that protrudes from the housing, a plurality of bracing devices supported in the housing for generating directing forces that have radially alignable force components for the alignment of the drilling tool during drilling operations, wherein the bracing devices have anchoring elements, distributed over the circumference of the housing and arranged along at least one bracing plane, which anchoring elements are movable radially outwardly and inwardly and can preferably be retracted, shield-like into grooves in the housing, and the mobility of which is temperature-controlled.

Figure 2:
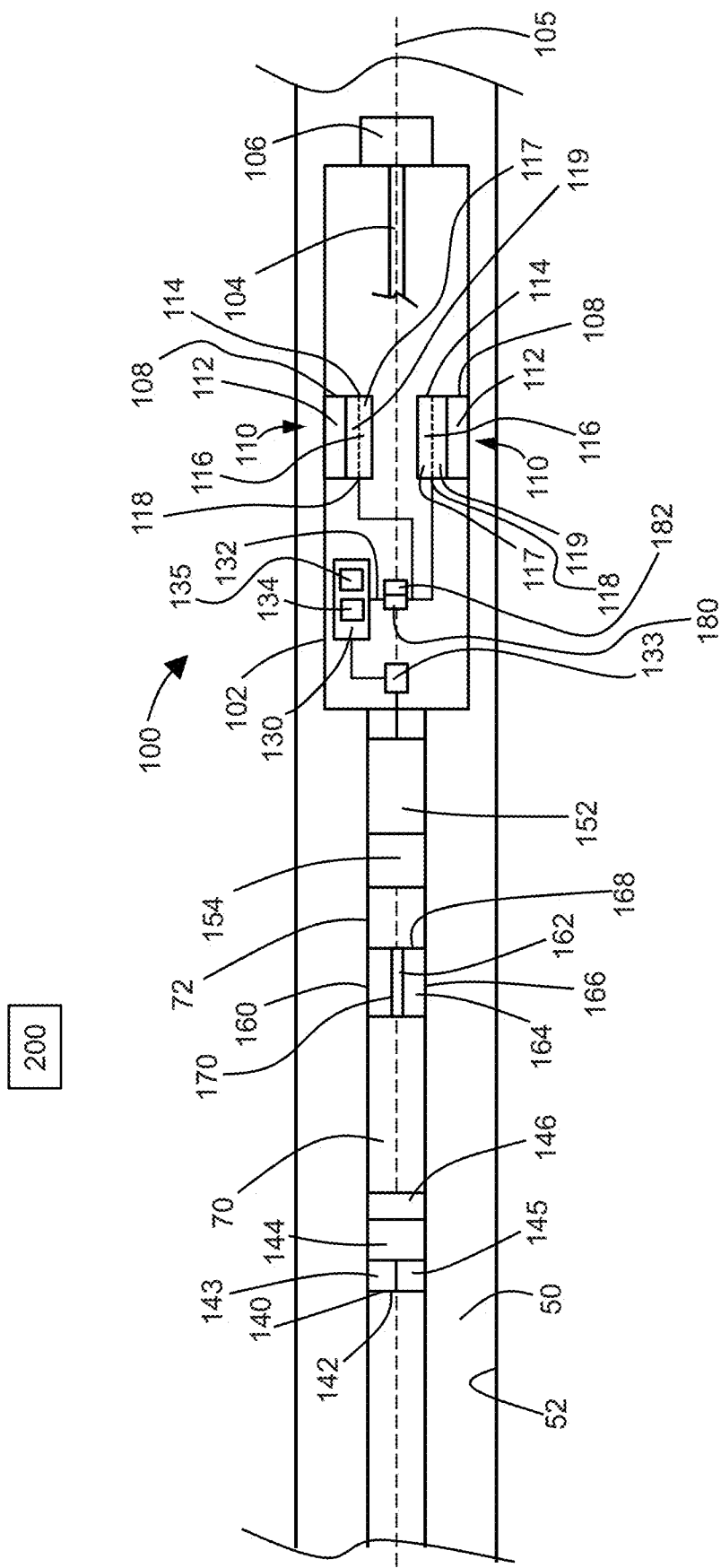
FIG. 2 is a schematic view of a drilling tool according to some embodiments.

Referring to FIG. 2 an embodiment of a drilling tool 100 is shown. Drilling tool 100 generally includes a tubular housing 102 a bit drive shaft 104 configured to rotate in the housing 102 and support a rotary drill bit 106 at a lower end of the bit drive shaft 104, wherein the rotary drill bit protrudes from the housing 102. Drilling tool 100 additionally includes a plurality of bracing devices 110 arranged in the housing 102 and configured to generate directing forces having radially alignable force components for the alignment of the drilling tool 100 during drilling operations, and a control device 130 configured to actuate the bracing devices 110. Bracing devices 110 may comprise anchoring elements 112 and an actuator assembly 114 to which the anchoring elements 112 are coupled, wherein the anchoring elements 112 are distributed over the circumference of the housing 102. The anchoring elements 112 may be movable radially outwardly and inwardly and are configured to be retracted into grooves 108 in the housing 102, and wherein the radial movability of said anchoring elements 112 is temperature-controlled by the actuator assembly 114 which comprises at least one heat-expandable pressure medium 116 The pressure medium 116 may comprise at least one of a gas and a liquid.

The actuator assembly 114 may comprise a piston-cylinder assembly having a cylinder space 117 filled by the pressure medium 116, a heating assembly 118 configured to heat the pressure medium 116, and a piston 119 including an outer end that is coupled to at least one of the anchoring elements 112. Additionally, the actuator assembly 114 may comprise a piston-cylinder assembly comprising a piston 119 and a cylinder space 117 fluidically connected to a chamber of a chamber housing, and wherein the cylinder space 117 and the chamber may be filled with the pressure medium 116. Further the actuator assembly 114 may comprise a heating assembly 118 located on at least a part of one of an inner wall and an outer wall of the chamber housing for heating the housing and the pressure medium 116.

The piston 119 of the piston-cylinder assembly may be displaced radially relative to a longitudinal center axis 105 of the housing 102 in response to heating of the pressure medium 116 for a force-loaded placement of at least one of the anchoring elements 112 against a wall 52 of a wellbore 50 during the transition of said anchoring element 112 from a home position to an end position. Additionally, the piston 119 may be displaced radially relative to a longitudinal center axis 105 of the housing 102 in response to cooling of the pressure medium 116 for placement of at least one of the anchoring elements 112 on the housing 105 during the transition of said anchoring element 112 from an end position to a home position. In some embodiments, the piston-cylinder assembly may be configured as dual-action piston-cylinder assembly.

The control device 130 is configured to actuate the heating means via cables 132 with electric current supplied from a power supply 133 comprising at least one of a battery and an electric generator that is driven by a turbine 152 driven by a flow of drilling fluid. The control device 130 may comprise a sensor system 134 and the drilling tool 100 may comprise a data transfer device 140 configured to forward data acquired by the sensor system 134 to an above-ground control console 200. The data transfer device 140 may be configured to generate pressure signals for transmitting the data in a flushing channel 72 of the drill pipe string 70 by means of an impeller 160 acted on by a drilling fluid and which drives the generator to which an accumulator 154 is connected. An impeller shaft 162 may be supported within an axially extending impeller housing 164 which is filled with oil and forms a cylindrical annular gap 166 in relation to the drill pipe string 70. The impeller 160 may be driven in rotation in response to flow of the drilling fluid within the annular gap 166, and a pressure compensating piston 168 acted on by the drilling fluid is provided above an oil reservoir formed in the impeller housing 164, and wherein a seal 170 is provided between the housing 164 and the impeller shaft 162

The data transfer device 140 may be configured to generate pressure signals for transmitting the data during drilling operations through a flushing channel 72 of the drill pipe string 70, and wherein an impeller is positioned in the flushing channel 72. Additionally the data transfer device 140 may be configured to forward the data by means of pressure pulses in a flowing drilling fluid, wherein said data transfer device 140 comprises an information generating device 140 a transmitting device 142 connected to the information generating device 140, and a receiving device 144 configured to receive and analyze the data transmitted via the pressure pulses in the control console 200, wherein the transmitting device 142 includes a resilient flow resistor 143 in the drilling fluid and an actuator assembly 145 configured to modify the flow cross-section of the flow resistor in synchronization with the generated pressure pulses. The control device 130 may be connected to the data transfer device within 140 the drill pipe string 70 by means of pulses comprising sound waves, wherein a transmitting device 142 configured to generate the pulses is connected to the sensor system of the control device 130, and wherein the data transfer device comprises the receiving 144 device configured to receive and analyze the data transmitted via the pulses.

The data transfer device 140 may be configured to forward the data to a processor 135 of the control device. The processor 135 may be configured to feed the data to a control loop for multivariable control, and to compare the data as control variables with target values stored in the processor 135. The control device 130 may be configured to forward modified output variables in response to a deviation from the target values as signals to at least one of a switch 180 configured to apply a temperature to the pressure medium 116 and a regulator 182 configured to continuously and variably apply a temperature to the pressure medium 116 by supplying electric power to the heating assembly 118.

The rugged construction achieved by using the temperature-controlled bracing device of the drilling tool of the invention ensures
low maintenance,
continuous directional drilling operation,
constant control in real time,
continuous operation,
precisely controlled deep drilling, even with a slight path curvature, factoring in a wide range of position data and other measured values with processing thereof by means of control loops for multivariable control implemented in the control device,
the wireless transmission of information via pressure pulses in the drill string, continuously path-oriented drilling at great depths,
an increase in the time intervals between maintenance of the drilling tool according to the invention,
cost-saving directional drilling,
a substantial increase in the maintenance-free period of operation of the drilling tool according to the invention,
a substantial reduction in replacement materials and components,
a substantial reduction in operating costs,
a compact and cost-saving design of the drilling tool according to the invention,
low-wear and low-energy work of data transmission,
flawless transmission of data, and
automatic correction of the deviations in the bore from the specified drilling direction with simultaneous monitoring of the drilling path.

The invention claimed is:

1. A drilling tool, comprising:
a tubular housing;
a bit drive shaft configured to rotate in the housing and support a rotary drill bit at a lower end of the bit drive shaft, wherein the rotary drill bit protrudes from the housing;
a plurality of bracing devices arranged in the housing and configured to generate directing forces having radially alignable force components for the alignment of the drilling tool during drilling operations; and
a control device configured to actuate the bracing devices;
wherein the bracing devices comprise anchoring elements and an actuator assembly to which the anchoring elements are coupled, wherein the anchoring elements are distributed over the circumference of the housing;
wherein the anchoring elements are movable radially outwardly and inwardly and are configured to be retracted into grooves in the housing, and wherein the radial movability of said anchoring elements is temperature-controlled by the actuator assembly which comprises at least one heat-expandable pressure medium;
wherein the pressure medium comprises at least one of a gas having a coefficient of isobaric volume expansion $\gamma$ at 20° C. of 3.0 to $4.0 \times 10^{-3}$ K$^{-1}$, and a liquid having a coefficient of volume expansion $\gamma$ at 18° C. of 7.2 to $16.3 \times 10^{-4}$ K$^{-1}$.

2. The drilling tool according to claim 1, wherein: the actuator assembly comprises a piston-cylinder assembly having a cylinder space filled by the pressure medium, a heating assembly configured to heat the pressure medium, and a piston including an outer end that is coupled to at least one of the anchoring elements.

3. The drilling tool according to claim 2, wherein the piston is displaced radially relative to a longitudinal center axis of the housing in response to heating of the pressure medium for a force-loaded placement of at least one of the anchoring elements against a wellbore wall during the transition of said anchoring element from a home position to an end position.

4. The drilling tool according to claim 2, wherein the piston is displaced radially relative to a longitudinal center axis of the housing in response to cooling of the pressure medium for placement of at least one of the anchoring elements on the housing during the transition of said anchoring element from an end position to a home position.

5. The drilling tool according to claim 2, wherein the control device is configured to actuate the heating assembly via cables with electric current supplied from at least one of a battery and an electric generator that is driven by a turbine driven by a flow of drilling fluid.

6. The drilling tool according to claim 2, wherein the piston-cylinder assembly is configured as dual-action piston-cylinder assembly.

7. The drilling tool according to claim 2, wherein the control device comprises a sensor system, and wherein the drilling tool comprises a data transfer device configured to forward data acquired by the sensor system to an above-ground control console.

8. The directional drilling tool according to claim 7, wherein:
the data transfer device is configured to generate pressure signals for transmitting the data in a flushing channel of the drill pipe string by means of an impeller acted on by a drilling fluid and which drives a generator to which an accumulator is connected;
the impeller comprises an impeller shaft supported within an axially extending impeller housing, which is filled with oil and forms a cylindrical annular gap in relation to the drill pipe string;
the impeller is driven in rotation in response to flow of the drilling fluid within the annular gap; and
a pressure compensating piston acted on by the drilling fluid is provided above an oil reservoir formed in the impeller housing, and wherein a seal is provided between the housing and the impeller shaft.

9. The drilling tool according to claim 7, wherein the data transfer device is configured to generate pressure signals for transmitting the data during drilling operations through a flushing channel of the drill pipe string, and wherein an impeller is positioned in the flushing channel.

10. The drilling tool according to claim 7, wherein the data transfer device is configured to forward the data by means of pressure pulses in a flowing drilling fluid, wherein said data transfer device comprises an information generating device, a transmitting device connected to the information generating device, and a receiving device configured to receive and analyze the data transmitted via the pressure pulses in the control console, wherein the transmitting device includes a resilient flow resistor in the drilling fluid and an actuator assembly configured to modify the flow cross-section of the flow resistor in synchronization with the generated pressure pulses.

11. The drilling tool according to claim 7, wherein the control device is connected to the data transfer device within the drill pipe string by means of pulses comprising sound waves, wherein a transmitting device configured to generate the pulses is connected to the sensor system of the control device, and wherein the data transfer device comprises a receiving device configured to receive and analyze the data transmitted via the pulses.

12. The drilling tool according to claim 7, wherein:
the data transfer device is configured to forward the data to a processor of the control device;
the processor is configured to feed the data to a control loop for multivariable control; and
the processor is configured to compare the data as control variables with target values stored in the processor,
wherein the control device is configured to forward modified output variables in response to a deviation from the target values as signals to at least one of a switch configured to apply a temperature to the pressure medium, and a regulator configured to continuously and variably apply a temperature to the pressure medium by supplying electric power to the heating assembly.

13. The drilling tool according to claim 1, wherein:
the actuator assembly comprises a piston-cylinder assembly comprising a piston and a cylinder space fluidically connected to a chamber of a chamber housing, and wherein the cylinder space and the chamber are filled with the pressure medium, and
the actuator assembly comprises a heating assembly located on at least a part of one of an inner wall and an outer wall of the chamber housing for heating the housing and the pressure medium.

14. The drilling tool according to claim 1, characterized in that an upper end of the bit drive shaft is configured to couple to a drill pipe string.

15. A drilling tool, comprising:
a tubular housing;
a bit drive shaft configured to rotate in the housing and support a rotary drill bit at a lower end of the bit drive shaft, wherein the rotary drill bit protrudes from the housing;
a plurality of bracing devices arranged in the housing and configured to generate directing forces having radially alignable force components for the alignment of the drilling tool during drilling operations; and
a control device configured to actuate the bracing devices;
wherein the bracing devices comprise anchoring elements and an actuator assembly to which the anchoring elements are coupled, wherein the anchoring elements are distributed over the circumference of the housing;
wherein the anchoring elements are movable radially outwardly and inwardly and are configured to be retracted into grooves in the housing, and wherein the radial movability of said anchoring elements is temperature-controlled by the actuator assembly which comprises at least one heat-expandable pressure medium;
wherein the pressure medium comprises at least one of a gas and a liquid.

16. The drilling tool according to claim 15, wherein:
the actuator assembly comprises a piston-cylinder assembly having a cylinder space filled by the pressure medium, a heating assembly configured to heat the pressure medium, and a piston including an outer end that is coupled to at least one of the anchoring elements.

17. The drilling tool according to claim 16, wherein the piston is displaced radially relative to a longitudinal center axis of the housing in response to heating of the pressure medium for a force-loaded placement of at least one of the anchoring elements against a wellbore wall during the transition of said anchoring element from a home position to an end position.

18. The drilling tool according to claim 16, wherein the piston is displaced radially relative to a longitudinal center axis of the housing in response to cooling of the pressure medium for placement of at least one of the anchoring elements on the housing during the transition of said anchoring element from an end position to a home position.

19. The drilling tool according to claim 16, wherein the control device is configured to actuate the heating assembly via cables with electric current supplied from at least one of a battery and an electric generator that is driven by a turbine driven by a flow of drilling fluid.

20. The drilling tool according to claim 15, wherein:
the actuator assembly comprises a piston-cylinder assembly comprising a piston and a cylinder space fluidically connected to a chamber of a chamber housing, and wherein the cylinder space and the chamber are filled with the pressure medium, and
the actuator assembly comprises a heating assembly located on at least a part of one of an inner wall and an outer wall of the chamber housing for heating the housing and the pressure medium.

* * * * *